(12) United States Patent
Dally

(10) Patent No.: US 9,201,434 B2
(45) Date of Patent: Dec. 1, 2015

(54) MULTIPHASE CURRENT-PARKING SWITCHING REGULATOR

(71) Applicant: NVIDIA Corporation, Santa Clara, CA (US)

(72) Inventor: William J. Dally, Los Altos Hills, CA (US)

(73) Assignee: NVIDIA Corporation, Santa Clara, CA (US)

( * ) Notice: Subject to any disclaimer, the term of this patent is extended or adjusted under 35 U.S.C. 154(b) by 306 days.

(21) Appl. No.: 13/783,137

(22) Filed: Mar. 1, 2013

(65) Prior Publication Data

US 2014/0247025 A1 Sep. 4, 2014

(51) Int. Cl.
  *G05F 1/00* (2006.01)
  *G05F 1/10* (2006.01)

(52) U.S. Cl.
  CPC .......................................... *G05F 1/10* (2013.01)

(58) Field of Classification Search
  CPC ..................................... G05F 1/10; G05F 3/16
  USPC .................. 323/222–225, 268, 271, 282, 285
  See application file for complete search history.

(56) References Cited

U.S. PATENT DOCUMENTS

| | | | | |
|---|---|---|---|---|
| 6,448,746 | B1 * | 9/2002 | Carlson | 323/272 |
| 7,804,733 | B2 * | 9/2010 | Alexander et al. | 365/226 |
| 7,889,525 | B2 | 2/2011 | Moussaoui | |
| 8,264,213 | B2 | 9/2012 | Lin et al. | |
| 2008/0055940 | A1 | 3/2008 | Lawson et al. | |
| 2008/0252273 | A1 | 10/2008 | Woo et al. | |
| 2009/0295357 | A1 * | 12/2009 | Lin et al. | 323/285 |
| 2010/0231186 | A1 | 9/2010 | Chen et al. | |
| 2010/0244799 | A1 | 9/2010 | Moussaoui | |
| 2011/0241640 | A1 * | 10/2011 | Qiu et al. | 323/283 |
| 2012/0176114 | A1 | 7/2012 | Yamadaya | |
| 2014/0097813 | A1 | 4/2014 | Dally | |
| 2014/0218001 | A1 | 8/2014 | Dally | |
| 2014/0225579 | A1 | 8/2014 | Dally | |

FOREIGN PATENT DOCUMENTS

| | | |
|---|---|---|
| DE | 102013114097 A1 | 8/2014 |
| DE | 102013114588 A1 | 8/2014 |

(Continued)

OTHER PUBLICATIONS

Examination Report from German Patent Application No. 10 2013 114 620.1, dated Sep. 5, 2014.

(Continued)

*Primary Examiner* — Matthew Nguyen
(74) *Attorney, Agent, or Firm* — Zilka-Kotab, PC

(57) ABSTRACT

A system and method are provided for regulating a voltage at a load. A target current is obtained and a number of regulator phases needed to provide the target current to a load is computed based on an efficiency characteristic of the regulator phases. The regulator phases are configured to provide the target current to the load. A multi-phase electric power conversion device comprises at least two regulator phases and a multi-phase control unit. The multi-phase control unit is configured to obtain the target current, compute the number of the regulator phases needed to provide the target current to the load based on the efficiency characteristic of the regulator phases, and configure the regulator phases to provide the target current to the load.

16 Claims, 16 Drawing Sheets

(56) References Cited

FOREIGN PATENT DOCUMENTS

| TW | 200949482 A | 12/2009 |
| TW | 201044755 A | 12/2010 |

OTHER PUBLICATIONS

Office Action from Taiwan Patent Application No. 102141478, dated Mar. 31, 2015.

Billings et al., "Switchmode Power Supply: Handbook," McGraw Hill, Third Edition, 2011, pp. 1.145-1.150; pp. 2.163-2.176; pp. 3.119-3.155.

Infineon, "High Current PN Half Bridge NovalithIC," Automotive Power, BTN7930 Data Sheet, Rev. 1.1, Nov. 2007, pp. 1-28.

Redl et al., "Ripple-Based Control of Switching Regulators—An Overview," IEEE Transaction on Power Electronics, vol. 24, No. 12, Dec. 2009, pp. 2669-2680.

Yousefzadeh et al., "Proximate Time-Optimal Digital Control for Synchronous Buck DC-DC Converters," EEE Transaction on Power Electronics, vol. 23, No. 4, Jul. 2008, pp. 2018-2026.

* cited by examiner

MULTIPHASE CURRENT-PARKING SWITCHING REGULATOR

FIELD OF THE INVENTION

The present invention relates to regulator circuits, and more specifically to multi-phase regulator circuits.

BACKGROUND

Conventional devices such as microprocessors and graphics processors that are used in high-performance digital systems may have varying current demands based on the processing workload. For example, current demands may increase dramatically when a block of logic is restarted after a stall or when a new request initiates a large computation such as the generation of a new image. Conversely, current demands may decrease dramatically when a block of logic becomes idle. When the current demand increases and sufficient power is not available, the supply voltage that is provided to the device may drop below a critical voltage level, potentially causing the device to fail to function properly. When the current demand decreases and the supply voltage that is provided to the device rises above a critical voltage level, circuits within the device may fail to function properly and may even be destroyed.

A conventional multi-phase switching regulator is an electric power conversion device that interfaces between a power supply and a device, providing current to the device and responding to changes in current demands to maintain a supply voltage level. However, a conventional multi-phase switching regulator relies on a large inductor for voltage conversion and the large inductor limits the ability of the conventional multi-phase switching regulator to quickly respond to dramatic changes in current demands (i.e., current transients). A typical 30 A phase of the conventional multi-phase switching regulator may use a 0.5 µH inductor for voltage conversion. The current response is limited to $di/dt=V/L$ which for $V=11V$ (dropping a 12V input to a 1V supply voltage level) and $L=0.5$ µH gives 22 A/µs. Increasing the current provided to a device by 10 A in would require at least 500 ns. Additionally, synchronization of the pulse width modulation switching operation may increase the current response time of the conventional multi-phase switching regulator by several microseconds. When a clock period of the device is less than the current response time, the device may fail to function properly. A 500 MHz clock has a period of 2 ns, so hundreds of clock periods may occur during a 500 ns current response time.

Thus, there is a need for improving regulation of voltage levels and/or other issues associated with the prior art.

SUMMARY

A system and method are provided for regulating a voltage at a load. A target current is obtained and a number of regulator phases needed to provide the target current to a load is computed based on an efficiency characteristic of the regulator phases. The regulator phases are configured to provide the target current to the load. A multi-phase electric power conversion device comprises at least two regulator phases and a multi-phase control unit. The multi-phase control unit is configured to obtain the target current, compute the number of the regulator phases needed to provide the target current to the load based on the efficiency characteristic of the regulator phases, and configure the regulator phases to provide the target current to the load.

DETAILED DESCRIPTION

An electric power conversion device provides a desired output voltage level to a load, such as a device. The electric power conversion device converts power received from a power source (e.g., battery or main power supply) to a supply voltage level that is provided to the load. An inductor is used to deliver additional current to the load and regulate the output voltage level with switching mechanisms modulating the average current that flows through the inductor. A capacitor is coupled between the load and ground to store any excess current (difference between the current provided through the inductor and the current delivered to the load).

Figure 1A:
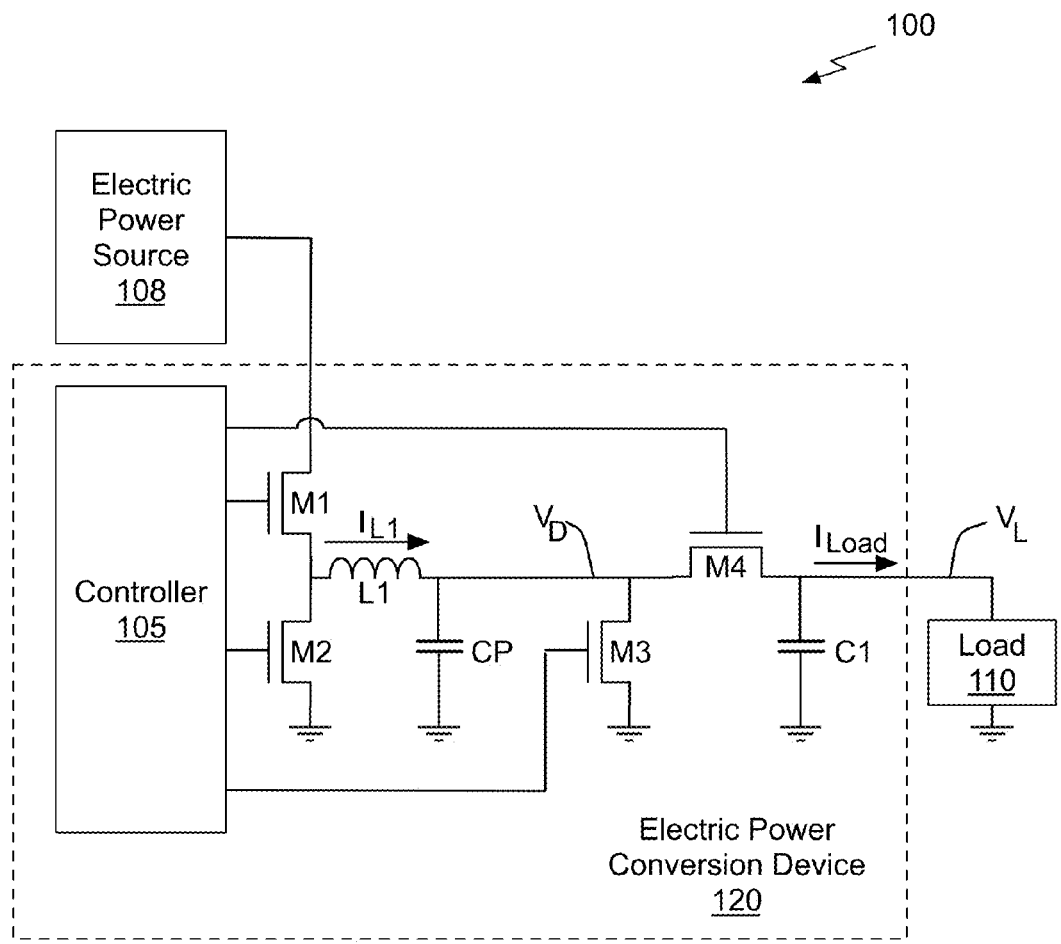
FIG. 1A illustrates an electric power conversion system including an electric power conversion device that is implemented as a current-parking switching regulator with a single inductor, in accordance with one embodiment.

FIG. 1A illustrates an electric power conversion system 100 including an electric power conversion device 120 that is implemented as a current-parking switching regulator with a single inductor L1, in accordance with one embodiment. The electric power conversion device 120 may be one phase of a multi-phase switching regulator, as shown in FIG. 1C. The electric power conversion device 120 is configured to provide a desired output voltage level ($V_L$) at the load 110 by converting power received from an electric power source 108. The electric power conversion device 120 includes a current control mechanism and a voltage control mechanism. The current control mechanism is coupled to the electric power source 108 and the controller 105 and is operable to control the average of the current $I_{L1}$ flowing through the inductor L1 and ensure a minimum current is provided across the multiple phases of a multi-phase switching regulator. For example, as illustrated, the current control mechanism may include one or more first switching mechanisms M1 and one or more second switching mechanisms M2. The switching mechanisms M1 and M2 may each include, for example, N-type power MOSFETs (metal oxide semiconductor field-effect transistor), and/or other switching mechanisms. Although single switching mechanisms M1 and M2 is illustrated for the ease of understanding, it will be appreciated that a plurality of switching mechanisms M1 and M2 may be connected in parallel to increase current capacity, decrease conduction losses, and the like.

The controller 105 is configured to apply one or more control signals to the switching mechanisms M1 and M2. For example, the controller 105 may be configured to generate pulse width modulation (PWM) signals or pulse frequency modulation (PFM) signals, a combination of PWM and PFM, and/or different control signals to selectively enable the switching mechanisms M1 and M2 according to a duty factor. Regardless of the specific configuration, the controller 105 is configured to provide control signals such that the switching mechanisms M1 and M2 are not concurrently enabled (i.e., turned on). In other words, only one of switching mechanism M1 and M2 is enabled at a time. Enabling switching mechanisms M1 and M2 concurrently provides a direct path between the supply of electric power source 108 and ground, thereby potentially damaging the electric power conversion device 120 and/or the load 110 and/or resulting in undesirable high power usage.

In contrast with conventional electric power conversion devices, the electric power conversion device 120 includes the voltage control mechanism in addition to the current control mechanism. The voltage control mechanism is coupled between the current control mechanism (at the downstream end of the inductor L1) and the load 110 and is operable to control the $V_L$. The current control mechanism is configured to generate current $I_{L1}$ that is "parked" in the inductor L1. The voltage control mechanism is operable to control the amount of the inductor current $I_{L1}$ that is delivered to a capacitor C1. As such, the voltage control mechanism comprises one or more switching mechanisms M3 and one or more switching mechanisms M4. The switching mechanisms M3 and M4 may each include, for example, N-type planar MOSFETs (metal oxide semiconductor field-effect transistor), and/or other switching mechanisms. Although single switching mechanisms M3 and M4 are illustrated for the ease of understanding, it will be appreciated that a plurality of switching mechanisms M3 and M4 may be connected in parallel to increase current capacity, decrease conduction losses, and the like.

A conventional electric power conversion device does not include the switching mechanisms M3 and M4, so the inductor L1 would instead be coupled directly to the capacitor C1 and the load 110. Any excess current that flows through the inductor L1 and is not consumed by the load 110 is accumulated on the capacitor C1 and any current drawn by the load 110 that exceeds the current provided by the inductor L1 is sourced by the capacitor C1. The inductor L1 resists changes in current, thereby preventing the stored energy in the inductor L1 from being released all at once to the load 110 when the current demands of the load 110 increase. This property of inductors, along with the storage capacity of the capacitor C1 enable $V_L$ to be sufficiently stable during steady-state operation (i.e., when the current demand of the load 110 is relatively constant). Nonetheless, there is some "ripple" in $V_L$ that depends on the size of the inductor L1, the size of the capacitor C1, and/or the switching frequency of the controller 105, among other factors. Generally speaking, as the size of the inductor L1 increases, the output ripple during steady state operation (i.e., approximately constant current demand at the load 110) proportionally decreases. Accordingly, the inductor L1 may be sized large enough in order to provide a $V_L$ that does not fluctuate outside a desired supply voltage range for the load 110. However, as previously explained, a conventional electric power conversion device is typically unable to respond to changes in the current needs of the load 110 quickly enough. The large inductance of L1 that is needed to reduce the ripple at $V_L$ increases the response time, producing larger voltage deviations when the current demand of the load 110 varies. The voltage control mechanism that is included in the electric power conversion device 120 enables faster response time to changes in current demand of the load 110 without necessitating decreasing the size of the inductor L1 which may cause the voltage ripple at $V_L$ to increase.

In contrast to the switching mechanisms M1 and M2, the voltage across the switching mechanisms M3 and M4 may be substantially less than the voltage drop across the inductor L1. For example, the voltage supplied at the downstream of the inductor L1 may be substantially equivalent to the output voltage at the load 110. Because the switching mechanisms M3 and M4 are switching a lower voltage, the switching mechanisms M3 and M4 may be constructed from lower-voltage devices, such as "planar" MOS transistors, as compared to the switching mechanisms M1 and M2. Lower-voltage devices can typically be switched at higher frequencies compared with higher-voltage devices, such as power MOSFETs. Therefore, power loss due to switching is reduced for the switching mechanisms M3 and M4 compared with the switching mechanisms M1 and M2. Hence switching mechanisms M3 and M4 can be switched at a substantially higher frequency than switching mechanisms M1 and M2.

Switching mechanisms M3 and M4 may be incorporated into an integrated circuit, thereby potentially reducing space used and/or reducing cost compared with using discrete components. For example, the switching mechanisms M3 and M4 may be realized on the same integrated circuit as the load 110, may be integrated on a separate die on the same package as the load 110, or may be integrated on a separate package. The switching mechanisms M3 and M4 may be realized as standard-voltage "core" transistors in a typical digital integrated-circuit process, or the switching mechanisms M3 and M4 may be realized as higher-voltage thick-oxide input-output transistors in a typical integrated-circuit process. In a preferred embodiment, the switching mechanism M4 is a P-type planar MOSFET and the switching mechanism M3 is an N-type planar MOSFET. However, one of ordinary skill in the art will understand that either type of MOSFET may be used for either switching mechanism with appropriate gate-drive circuitry without departing from the scope of the present disclosure.

The controller 105 may be further configured to apply one or more control signals to the voltage control mechanism. For example, the controller 105 may be configured to provide control signals to the switching mechanisms M3 and M4. As with the control signals provided to the switching mechanisms M1 and M2, the control signals that are provided to the switching mechanisms M3 and M4 may utilize PWM, PFM, bang-bang control, and/or any other suitable control schema in order to selectively enable the switching mechanism M3 or the switching mechanism M4. In some embodiments the control signals coupled to the switching mechanisms M3 and M4 may be at least partially synchronous with the control signals coupled to the switching mechanisms M1 and M2. In other embodiments, the control signals coupled to the switching mechanisms M3 and M4 may be asynchronous with the control signals coupled to the switching mechanisms M1 and M2. Furthermore, the control signals coupled to the switching mechanisms M3 and M4 may be provided at a different frequency than the control signals that are coupled to the switching mechanisms M1 and M2.

Regardless of the specific configuration of the control signals that are coupled to the switching mechanisms M3 and M4, the controller 105 may be configured to selectively enable the switching mechanism M3 and disable the switching mechanism M4 to disable the flow of current $I_{L1}$ to the load 110. Specifically, by enabling the switching mechanism M3 and disabling the switching mechanism M4, the instantaneous inductor current $I_{L1}$ flowing through the inductor L1 is diverted through the switching mechanism M3 to ground instead of being delivered to the capacitor C1. Conversely, by enabling the switching mechanism M4 and disabling the switching mechanism M3, substantially all of the instantaneous inductor current $I_{L1}$ flowing through the inductor L1 (less transistor conduction losses, inductor winding resistance, and the like) is provided to the capacitor C1.

The controller 105 may use PWM or PFM to switch the voltage control mechanism or may use a bang-bang technique. In either case, the duty factor (DF) determines the portion of the inductor current $I_{L1}$ that on average is supplied to the capacitor C1. The duty factor may range from 0-100%, where 0% corresponds to the state where the switching mechanism M4 is disabled (i.e., turned off) and the switching mechanism M3 is enabled and a 100% corresponds to the state where the switching mechanism M4 is enabled and the switching mechanism M3 is disabled. Changing the duty factor thereby changes the charge/discharge timing of the capacitor C1—a higher duty factor increases the current flow to the capacitor C1 and the load 110.

The capacitor C1 smoothes the square wave supply current provided through the switching mechanism M4 to generate $I_{Load}$ that is provided to the load 110. The $I_{Load}$ is provided to the load 110 according to the duty factor and the inductor current $I_{L1}$, as follows: $I_{Load}=DF \times I_{L1}$. As with the switching mechanisms M1 and M2, control signals are provided to the switching mechanisms M3 and M4 such that the switching mechanisms M3 and M4 are not concurrently enabled to avoid providing a direct path between the load 110 and ground (i.e., a short circuit across the capacitor C1).

During steady-state operation, the switching mechanism M3 is disabled and the switching mechanism M4 is enabled, such that substantially all of the inductor current $I_{L1}$ is provided to the load 110 as $I_{Load}$. The switching mechanisms M1 and M2 are selectively enabled ("switched") in order to control the inductor current $I_{L1}$, thereby controlling $V_L$. In this manner, if the voltage provided to the load 110 ($V_L$) is constant, the current provided through the switching mechanism M4 is substantially equivalent to the inductor current $I_{L1}$.

In sum, the current control mechanism is configured to generate current $I_{L1}$ that is parked in the inductor L1 and metered out to the load 110 by the voltage control mechanism. Because the voltage levels applied to the switching mechanisms M3 and M4 are low (i.e., the supply voltage of the load 110), the switching mechanisms M3 and M4 may be implemented as fast, inexpensive planar transistors and can be operated at very high frequency (e.g., 300 MHz) allowing very rapid response to current transients at the load 110. When the current demand at the load 110 changes (i.e., not steady-state operation), the switching mechanisms M3 and M4 of the voltage control mechanism may be controlled to quickly respond to the change in current demand by increasing or decreasing the amount of the current $I_{L1}$ this is metered out to the load 110. In general, the switching frequency of the current control mechanism is slower than the switching frequency of the voltage control mechanism due to the different types of switching mechanisms that are used.

A lumped element CP in the electric power conversion device 120 represents the parasitic capacitance on the downstream side of the inductor L1. Each time the switching mechanisms M3 and M4 are switched, the parasitic capacitance CP is charged to the load voltage $V_L$ (when the switching mechanism M4 is enabled) and then discharged to ground (when the switching mechanism M3 is enabled). Thus, each switching cycle of the switching mechanisms M3 and M4 an energy $E_P$ of $$E_P = (CP)V_L^2$$

is dissipated by charging and discharging the parasitic capacitance CP.

In a typical embodiment of the electric power conversion device 120, the inductor L1 is a surface mount 0.5 uH 30 A inductor, the switching mechanisms M3 and M4 are located on the package, and the capacitor C1 is on-chip and on-package bypass capacitance. Capacitor CP includes the capacitance of the vias, board traces, and package traces between the inductor L1 and the switching mechanisms M3 and M4. In a typical application the capacitance CP may total as much as 500 pF. If CP=−500 pF and $V_L$=1V, then $E_P$ is 500 pJ. At a switching frequency of 300 MHz, 150 mW is dissipated charging and discharging CP. When the current control mechanism and the voltage control mechanism of the electric power conversion device 120 are configured as one of a plurality of phases of a regulator, $E_P$ is scaled by the number of phases for the total energy that is dissipated due to the cumulative parasitic capacitance.

This switching power increases as the switching frequency ($f_s$) of the switching mechanisms M3 and M4 is increased. One would like to switch the switching mechanisms M3 and M4 at a high frequency to minimize the required size of C1 that is given by $$C_1 = \frac{I_{L1}(1-DF)}{f_S V_R}$$

where DF is the duty factor of the switching mechanism M4 and $V_R$ is a ripple voltage of $V_L$.

For example with a phase current of 30 A, a frequency of 300 MHz, and a ripple voltage of 20 mV the required capacitance C1 is 5 uF per phase. C1 is typically distributed across many smaller capacitors on the package to give low series inductance and to provide a flat impedance as a function of the switching frequency. Increasing the switching frequency reduces the required size of C1 but at the expense of increased switching power $E_P$.

An advantage of a current-parking switching regulator, such as the electric power conversion device 120, is that C1 is the only filter capacitance needed. In comparison, a conventional electric power conversion device that does not include the switching mechanisms M3 and M4 relies on a large (hundreds of µF) filter capacitance to filter the low frequency (typically 300 kHz) ripple.

The configuration of the electric power source 108, the controller 105, the switching devices M1 and M2, and the inductor L1 shown in FIG. 1A is typically referred to as a "buck" converter. While the electric power conversion device 120 is described in the context of this buck converter, one of ordinary skill in the art will understand that the techniques described to regulate a voltage provided to the load 110 can be applied to other "switch-mode" power conversion circuits including, but not limited to, a forward converter, a half-bridge converter, a full-bridge converter, a flyback converter, and/or variants thereof.

Figure 1B:
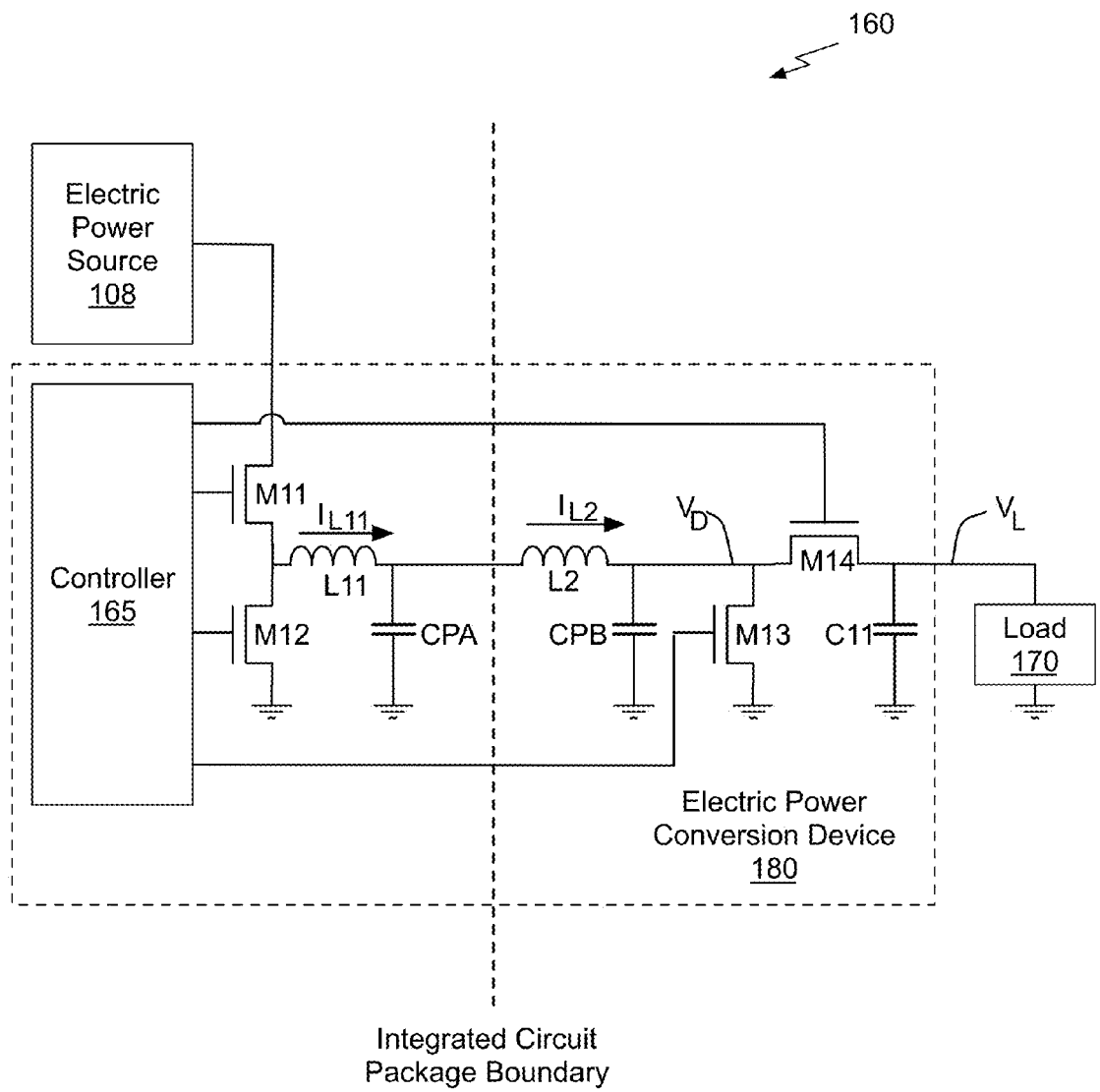
FIG. 1B illustrates a current-parking switching regulator with a split inductor, in accordance with one embodiment.
Figure 1C:
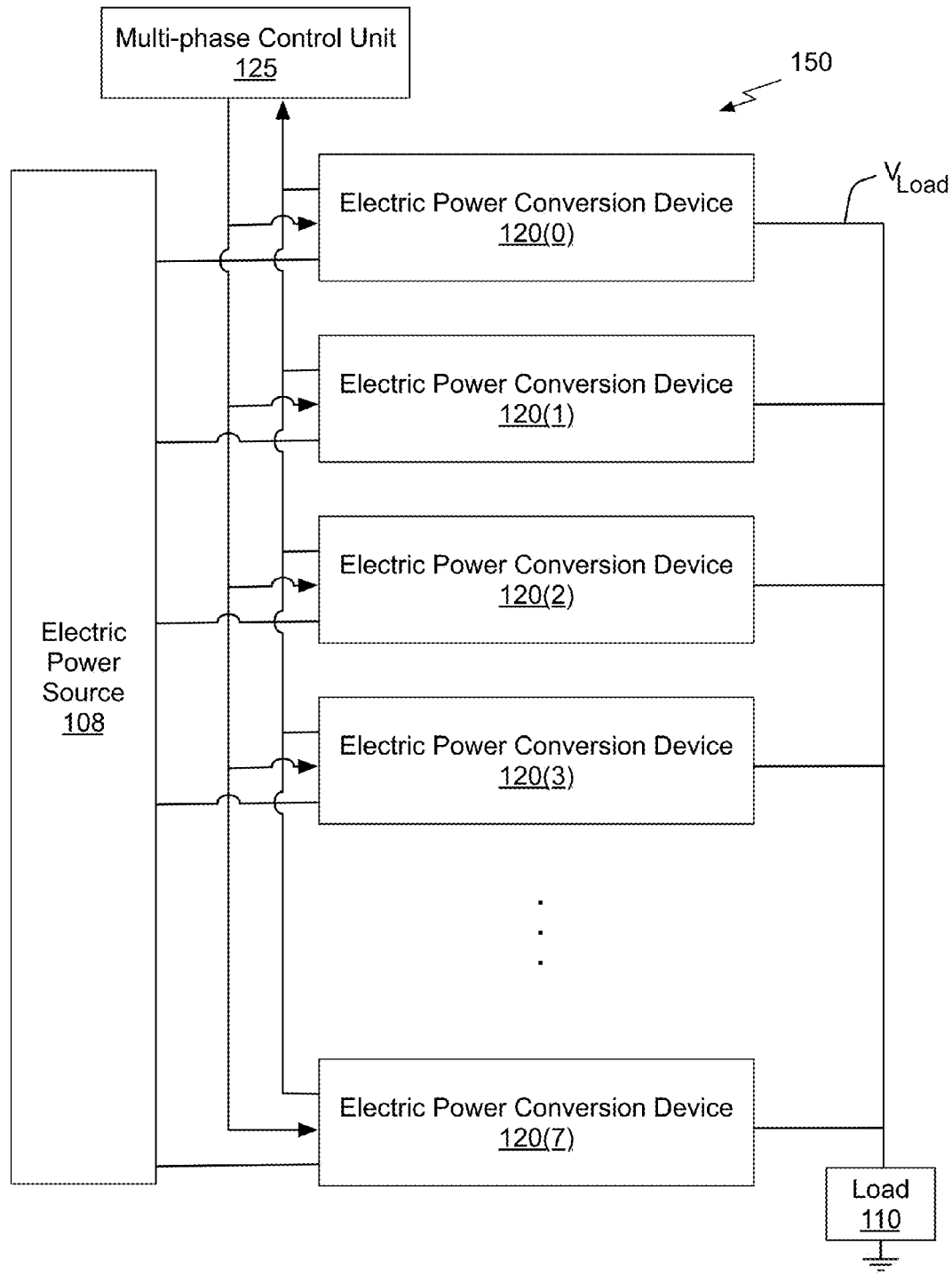
FIG. 1C illustrates a multi-phase switching regulator that includes multiple electric power conversion devices, in accordance with one embodiment.

FIG. 1B illustrates an electric power conversion system 160 including an electric power conversion device 180 that is implemented as a current-parking switching regulator with a split inductor, in accordance with one embodiment. Compared with the electric power conversion device 120 shown in FIG. 1A, the electric power conversion device 180 includes a first inductor L11 that is coupled in series with a second inductor L2 to form a split inductor. Splitting the inductor reduces losses due to parasitic capacitance CPA on the downstream side of the first inductor L11.

The electric power conversion device 180 may be one phase of a multi-phase switching regulator. The electric power conversion device 180 is configured to provide a desired output voltage level ($V_L$) at the load 170 by converting power received from an electric power source 108. The electric power conversion device 180 includes a current control mechanism and a voltage control mechanism. The current control mechanism is coupled to the electric power source 108 and the controller 165 may be configured to generate control signals in the same manner as the controller 105 and is operable to control the average of the current $I_{L11}$ flowing through the inductor L11 and the current $I_{L2}$ flowing through the inductor L2. For example, as illustrated, the switching mechanisms M11 and M12 are configured and operable in the same manner as previously described switching mechanisms M1 and M2, respectively. Similarly, the switching mechanisms M13 and M14 are configured and operable in the same manner as previously described switching mechanisms M3 and M4, respectively. The capacitor C11 performs substantially the same function as the capacitor C1.

Using two different inductors L11 and L2 to form a split inductor reduces the switching energy so that the bulk of the parasitic capacitance falls between the inductor L11 and L2, shown as a first parasitic capacitance CPA. In one embodiment, L11 is a 0.5 pH 30 A first inductor on a printed circuit board (e.g., a discrete component) and the second inductor L2 is a 1 nH inductor in the package that encloses the load 170. The first parasitic capacitance CPA includes the capacitance of the vias, board traces, and package traces between the first inductor L11 and the second inductor L2. The first parasitic capacitance CPA may be approximately 490 pF. The second parasitic capacitance CPB consists primarily of the drain capacitance of the switching mechanisms M13 and M14 and may be approximately 10 pF. If CPB=10 pF and $V_L$=1V, then $E_P$ is 10 pJ and, at a switching frequency of 500 MHz, 5 mW is dissipated charging and discharging CPB.

The switching frequency of 500 MHz, allows use of a 0.5 µF capacitor (implemented as a distributed array of smaller capacitors in some embodiments) for the capacitor C11. The 1 nH inductance of the second inductor L2 can be formed by integrating a ferrite bead around the traces or bumps carrying the current $I_{L2}$ or by simply running a trace a suitable distance from the ground return (making the second inductor L2 a planar air-core inductor). The resonant frequency of the tank circuit formed by L2 and the first parasitic capacitance CPA is $f_r$=230 MHz. Thus, as long as the switching frequency of the switching mechanisms M13 and M14 is high compared to $f_r$, the capacitance of the first parasitic capacitance CPA is effectively isolated from the switching node $V_L$. Because the first parasitic capacitance CPA is located between the first inductor L11 and the second inductor L2, CPA is isolated and is lossless. Any excess current is stored in the split inductor formed by the first inductor L11 and the second inductor L2.

FIG. 1C illustrates a multi-phase switching regulator 150 that includes a multi-phase control unit 125 and electric power conversion devices 120, in accordance with one embodiment. The electric power conversion device 180 shown in FIG. 1B may replace one or more of the electric power conversion devices 120 shown in FIG. 1C. Each of the electric power conversion devices 120 is one phase of a eight-phase switching regulator. In one embodiment, each electric power conversion device 120 is configured to provide a desired output voltage level ($V_L$) at the load 110 by converting power received from an electric power source 108 for one phase of the eight phases. A single controller, shown as the multi-phase control unit 125 may be used to control each of the electric power conversion devices 120. The multi-phase control unit 125 is configured to receive information from the dedicated controller 105 within each electric power conversion device 120 and to configure each controller 105 to generate the total current that is provided to the load 100.

A single filter capacitor C1, or parallel combination of filter capacitors, may be shared by the different electric power conversion devices 120 rather than including a filter capacitor C1 in each of the electric power conversion devices 120. Additionally, one or more of the electric power conversion devices 120 may be replaced with a current-parking switching regulator with a split inductor or a conventional electric power conversion device.

At any point in time, the multi-phase control unit 125 has a target upstream current $I_{TU}$ that needs to be delivered to the load 110. The different phases (i.e., electric power conversion devices 120) of the multi-phase switching regulator 150 are configured to generate a total current that approximates $I_{TU}$. One or more of the current control mechanisms within each phase is configured to generate at least a portion of the current $I_{TU}$ so that the combined draw current of the activated phases ($I_U$) approximates the current $I_{TU}$.

For example, when $I_{TU}$=100 Amps and each phase can be configured to generate $I_{L1}$=30 Amps, 4 different phases are activated. Specifically, the current control mechanisms within the electric power conversion devices 120(0), 120(1), and 120(2) are each configured to generate $I_{L1}$=30 Amps and the switching mechanisms M4 in the electric power conversion devices 120(0), 120(1), and 120(2) are configured to provide the 30 Amps to the load 110. The three phases provide 90 of the 100 Amps. A fourth phase, the electric power conversion device 120(3) is configured to generate the remaining 10 Amps. The electric power conversion device 120(3) may be configured to generate $I_{L1}$=30 Amps and the voltage control mechanism may be configured to provide 10 of the 30 Amps of $I_{L1}$ as $I_{Load}$ by alternately enabling and disabling the switching mechanisms M3 and M4. The remaining electric power conversion devices 120(4) through 120(7) may be deactivated by the multi-phase control unit 125.

Configuring three of phases of the voltage control mechanisms to be "on" (i.e., enabling the switching mechanism M4 and disabling the switching mechanism M3) improves efficiency of the multi-phase switching regulator 150 because losses due to switching are reduced. Only one voltage control mechanism of the activated phases is configured to switch to provide the remaining current. The efficiency of current generation for the electric power conversion devices 120 varies depending on the different amount of current $I_P$ that is generated. Therefore, in order to deliver the target current $I_{TU}$ efficiently, the number of phases which are activated may depend on the efficiency characteristic of the phases. In the previous example, the phases may operate at a peak efficiency of 95% when $I_{L1}$=30 Amps compared with lower efficiency for the generation of less than or greater than 30 Amps.

Two or more of the current control mechanisms within the phases may be activated in a staggered manner to keep $I_U$ above $I_{TU}$ at all points during the upstream switching cycle (i.e., cycle during which the switching mechanisms M1 and M2 are alternately enabled and disabled). The multi-phase control unit 125 may be configured to use current-mode control to configure the activated phases to each deliver a peak current of $I_{Pmax}$ where $$I_{Pmax} = \frac{\left(1 + \frac{R}{N}\right)I_{TU}}{N}.$$

The per-phase current $I_P$ is 1/N the total target current $I_{TU}$. To calculate the peak current over one cycle of the activated phases, $I_P$ is multiplied by 1+R/N where R is the ripple current (in Amps) of one phase. When multiple phases are activated to generate $I_U$, the effective ripple is reduced by a factor of N because the phases generate current $I_P$ in a staggered manner. In other words, the combined current, $I_U$ is generated by interleaving the currents $I_P$ produced by each active phase.

Figure 1D:
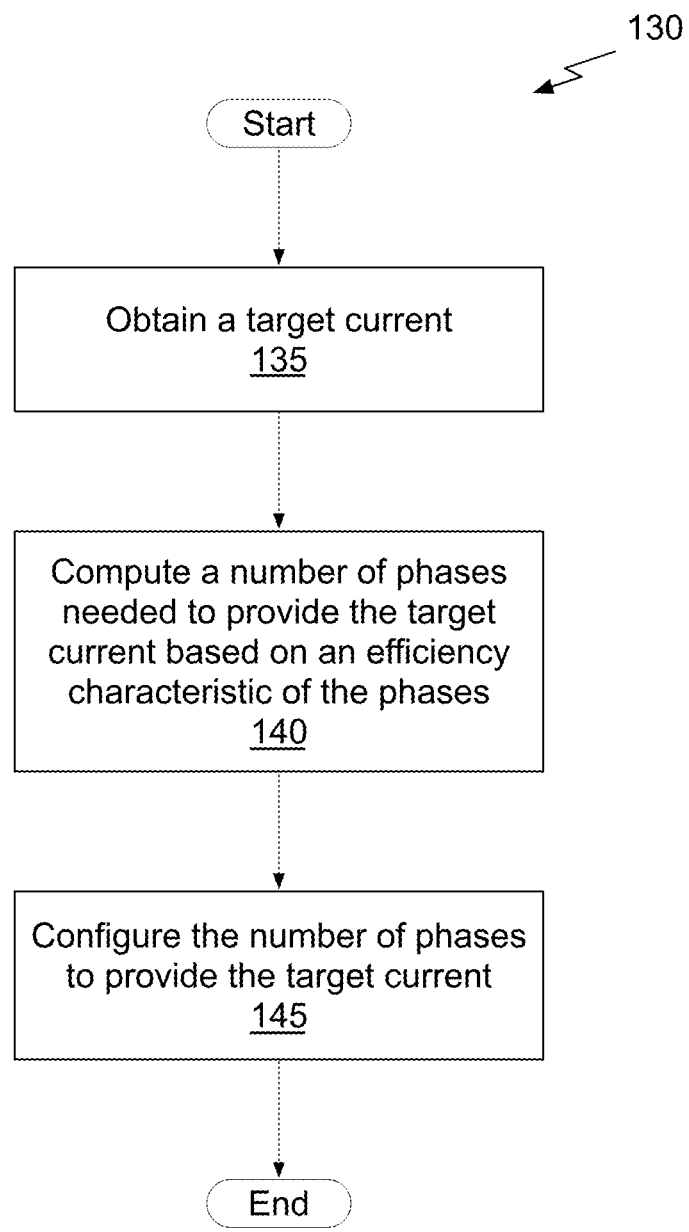
FIG. 1D illustrates a flowchart of a method for configuring a multi-phase switching regulator, in accordance with one embodiment.

FIG. 1D illustrates a flowchart 130 of a method for configuring the multi-phase switching regulator 150, in accordance with one embodiment. At step 135, a target current $I_{TU}$ is received by the multi-phase switching regulator 150. At step 140, the multi-phase switching regulator 150 computes a number of phases that are needed to provide the target current to the load 110. In one embodiment, the number of active phases (N) is computed based on a power conversion efficiency characteristic of the phases. At step 145, N phases (i.e., at least one phase) is configured to provide the target current to the load 110.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2A:
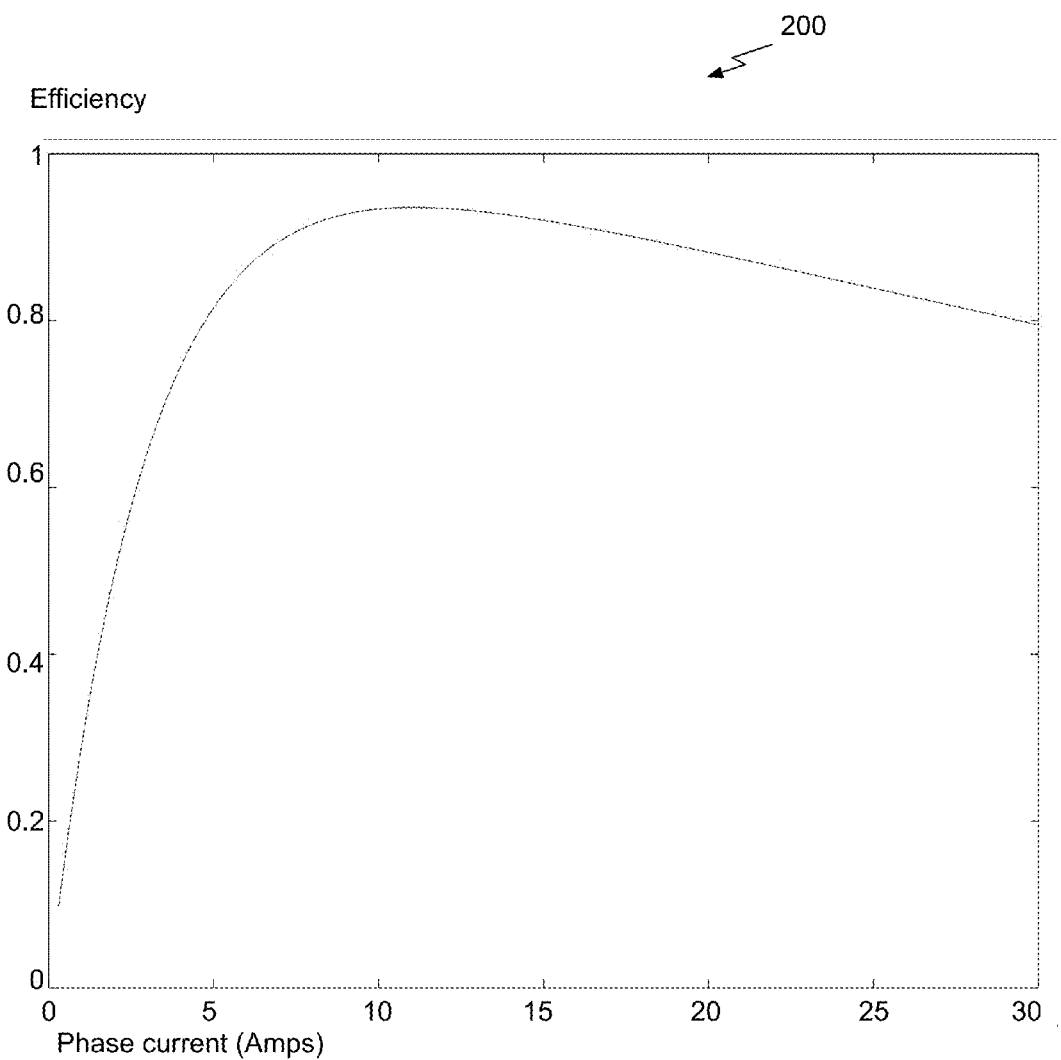
FIG. 2A illustrates a graph of efficiency for a single phase of a switching regulator as a function of phase current, in accordance with one embodiment.

FIG. 2A illustrates a graph 200 of power conversion efficiency $e(I_p)$ for a single phase of a switching regulator, such as the electric power conversion device 120 or 180, as a function of phase current $I_P$ (i.e., the current $I_{Load}$ provided by the phase), in accordance with one embodiment. At low currents, fixed overheads result in low efficiency. At high currents, conduction losses are increased, reducing efficiency. For the particular curve shown in the graph 200, power conversion efficiency is maximized at 90% with a phase current $I_P$ of 10 Amps.

If N phases are active each carrying current $I_P$, an additional phase should be energized any time $$e(I_P) > e\left(\frac{NI_P}{N+1}\right)$$

to maximize the power conversion efficiency. In one embodiment, the multi-phase control unit 125 is configured to compute the number of active phases, N to optimize power conversion efficiency. Additionally, the start time at which each active phase provides current $I_P$ to the load 110 may be staggered by 360 degrees/N to minimize ripple.

Figure 2B:
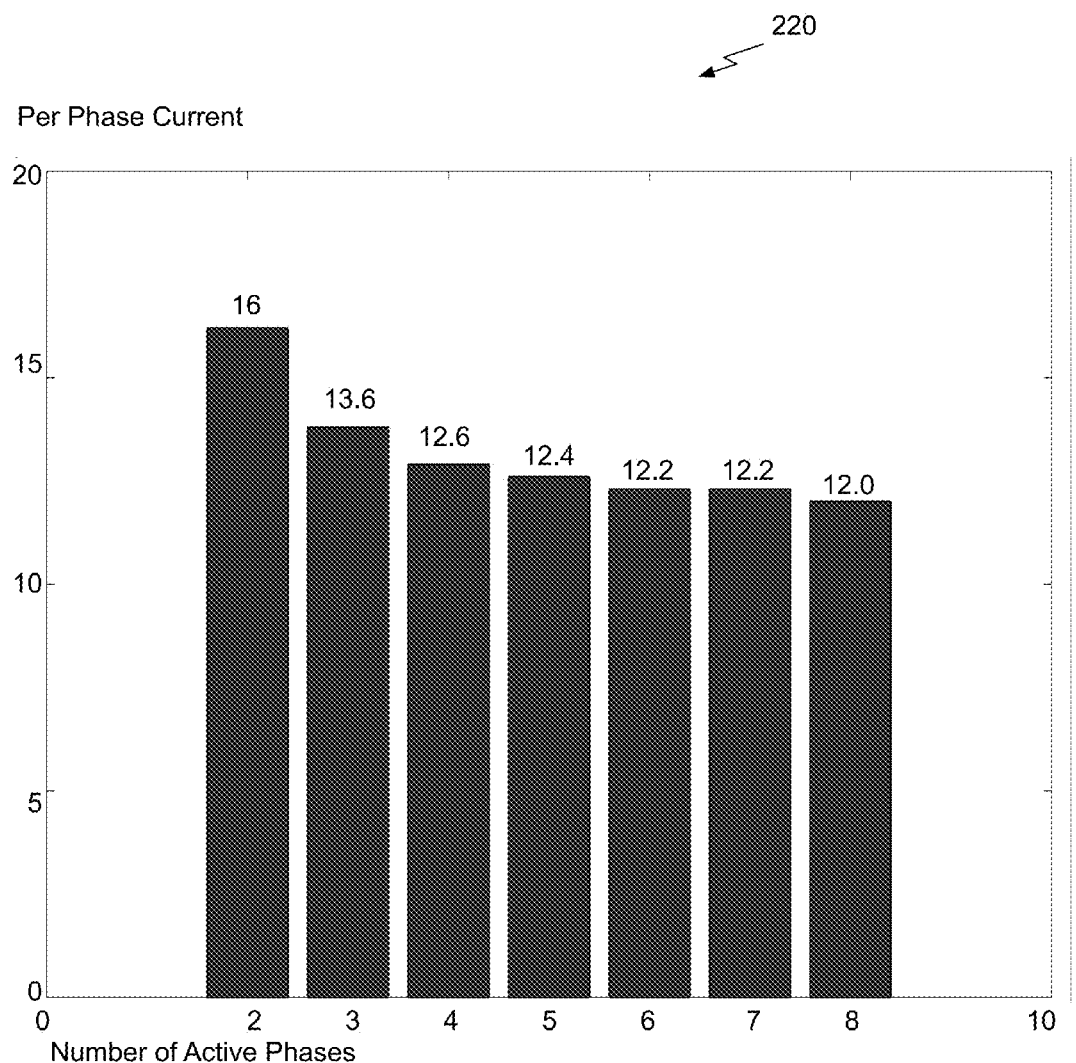
FIG. 2B illustrates a graph of the optimal number of active phases that should be enabled based on the per-phase current, in accordance with one embodiment.

FIG. 2B illustrates a graph 220 of the optimal number of active phases (N) that should be activated based on the per-phase current $I_P$, in accordance with one embodiment. Activation of a single phase is optimal until the phase current reaches about 16 Amps. Then, a second phase is activated—so that each of the two phases generates 8 Amps (i.e., for a total current of 16 Amps). As the current demand increases, the two phases are ramped up to generate more current until $I_P$ reaches 13.6 Amps for each of the two phases. When $I_P$ reaches 13.6 Amps, a third phase is activated—so that each of the three phases generates approximately 9.1 Amps (i.e., for a total current of 27.3 Amps). When $I_P$ reaches 12.6 Amps, a fourth phase is activated—so that each of the four phases generates approximately 9.45 Amps (i.e., for a total current of 37.8 Amps). When $I_P$ reaches 12.4 Amps, a fifth phase is activated—so that each of the five phases generates approximately 9.9 Amps (i.e., for a total current of 49.6 Amps). As the current demand increases, additional phases are activated to meet the demand while optimizing the power conversion efficiency. Similarly, as the current demand decreases, the phases are deactivated based on the per-phase current $I_P$ while optimizing the power conversion efficiency.

Figure 2C:
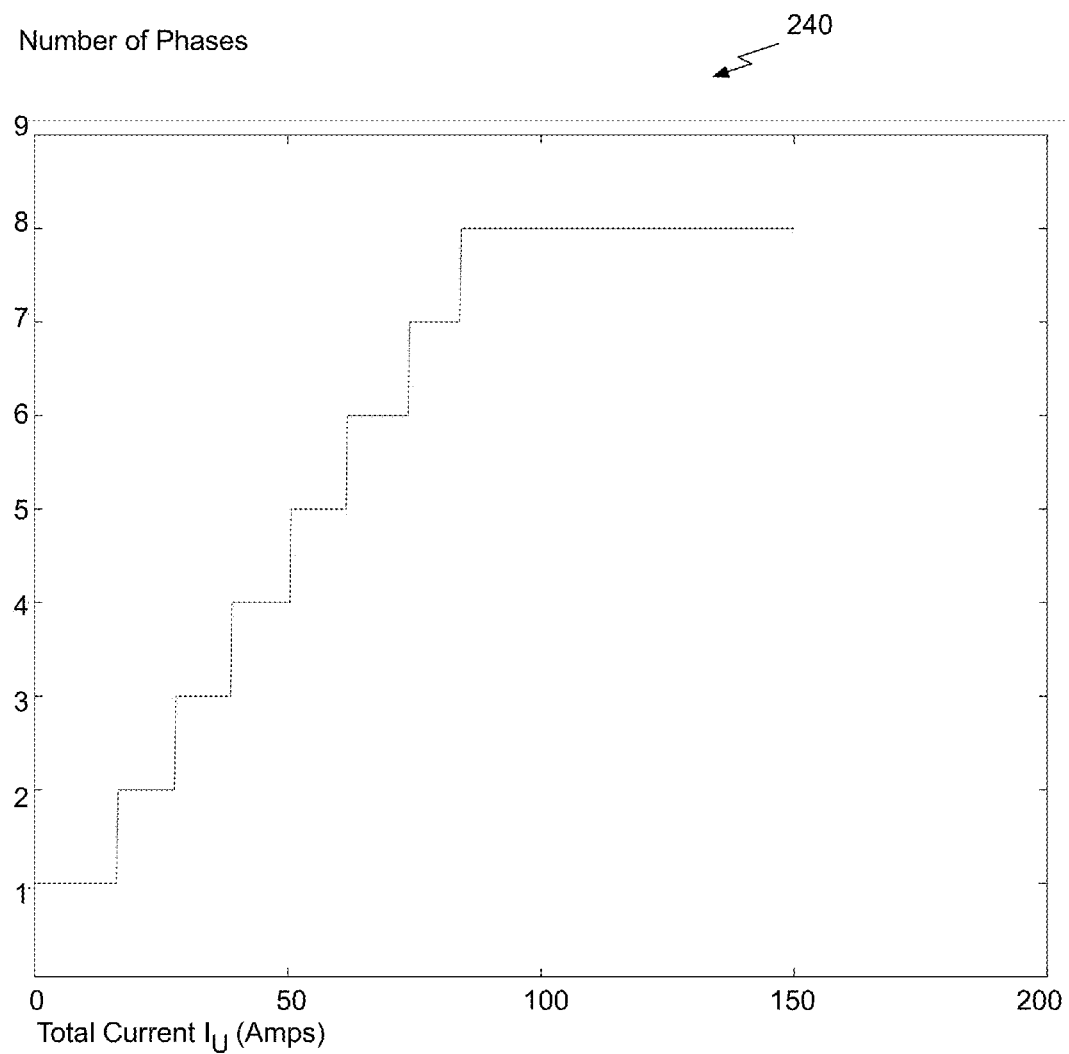
FIG. 2C illustrates a graph of the optimal number of active phases verses the total current, in accordance with one embodiment.

FIG. 2C illustrates a graph 240 of the optimal number of active phases N for maximizing power conversion efficiency verses the combined current draw of the activated phases, $I_U$, in accordance with one embodiment. In one embodiment, the multi-phase control unit 125 computes the number of active phases N for $I_{TU}$ using the graph 240 adjusted to account for ripple using a lookup table that returns N as a function of $I_{TU}$. In an alternate embodiment, the optimal number of phases N is computed by performing a gradient search. The gradient search is performed by the multi-phase control unit 125 by measuring the power conversion efficiency with N phases activated, then the number of activated phases is increased or decreased by one, and the power conversion efficiency is measured again. The multi-phase control unit 125 uses the configuration of activated phases having higher power conversion efficiency.

Figure 2D:
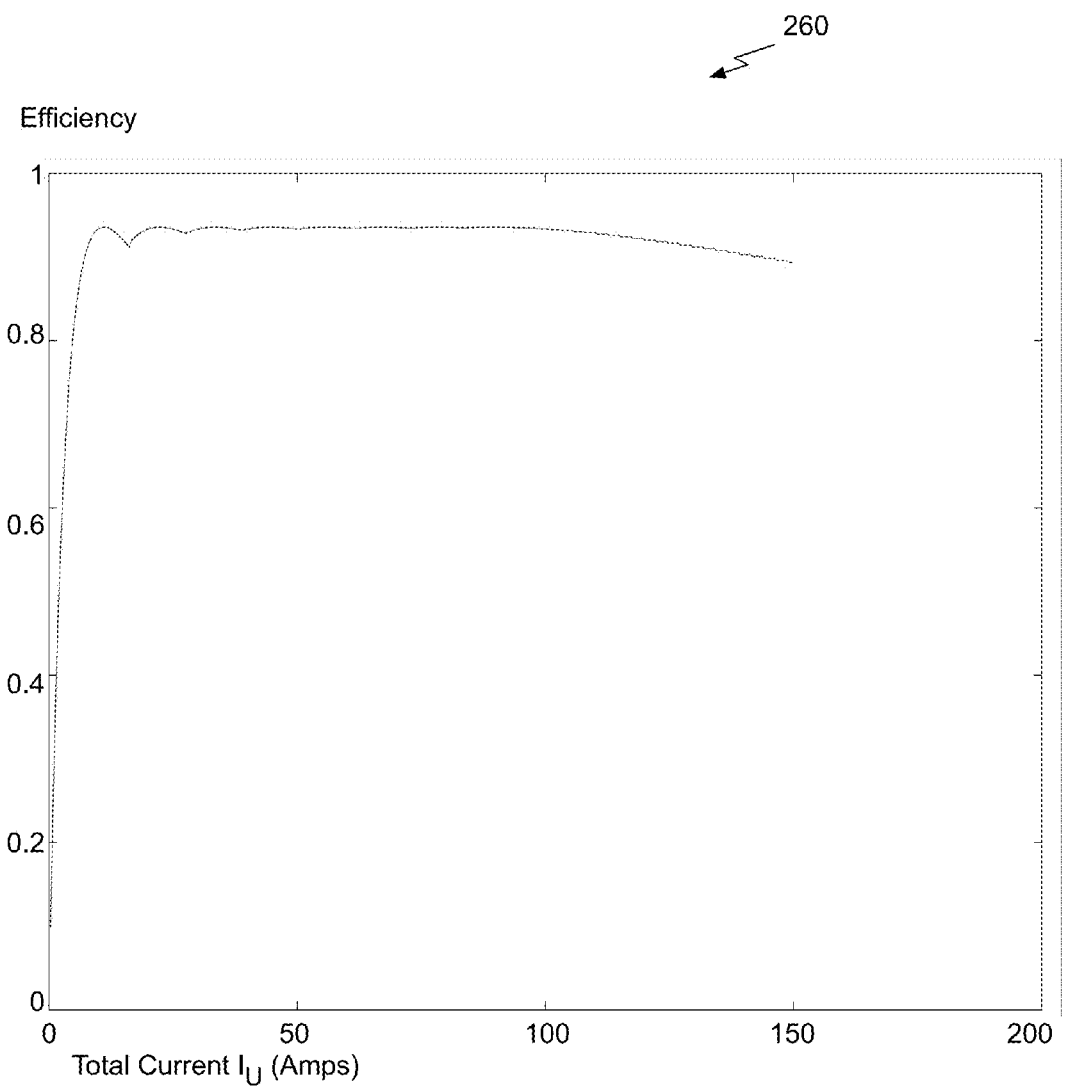
FIG. 2D illustrates a graph of the efficiency of the active phases as a function of the total current, in accordance with one embodiment.

FIG. 2D illustrates a graph 260 of the power conversion efficiency of the active phases, N, as a function of the total current $I_U$, in accordance with one embodiment. The graph 260 results when the optimal number of phases N is activated at each point along the axis showing the total current $I_U$. In one embodiment, the multi-phase control unit 125 is configured to track the transient response of the phase being activated or deactivated and commands the other activated phases to maintain the total current $I_U$ above the target current $I_{TU}$ at all times.

Downstream Control

During operation, $I_{TU}$ is derived from the combined current draw $I_U$ of the phases (i.e., electronic power conversion devices 120), the measured downstream duty factor (DDF), and the target duty factor $D_T$ obtained by the multi-phase control unit 125. $I_P$ and DDF are measured quantities that are provided by the phases as inputs to the multi-phase control unit 125. The combined DDF and $I_U$ may be computed by the multi-phase control unit 125 using the per-phase DDF and $I_U$ values. The target duty factor $D_T$ may be provided as an input to the multi-phase switching regulator 150 by power management software. A low $D_T$ may be commanded before an anticipated increase in the current demanded by the load 110. A $D_T$ approaching unity is used when power consumption of the load 110 is at a steady state or expected to drop.

Figure 3A:
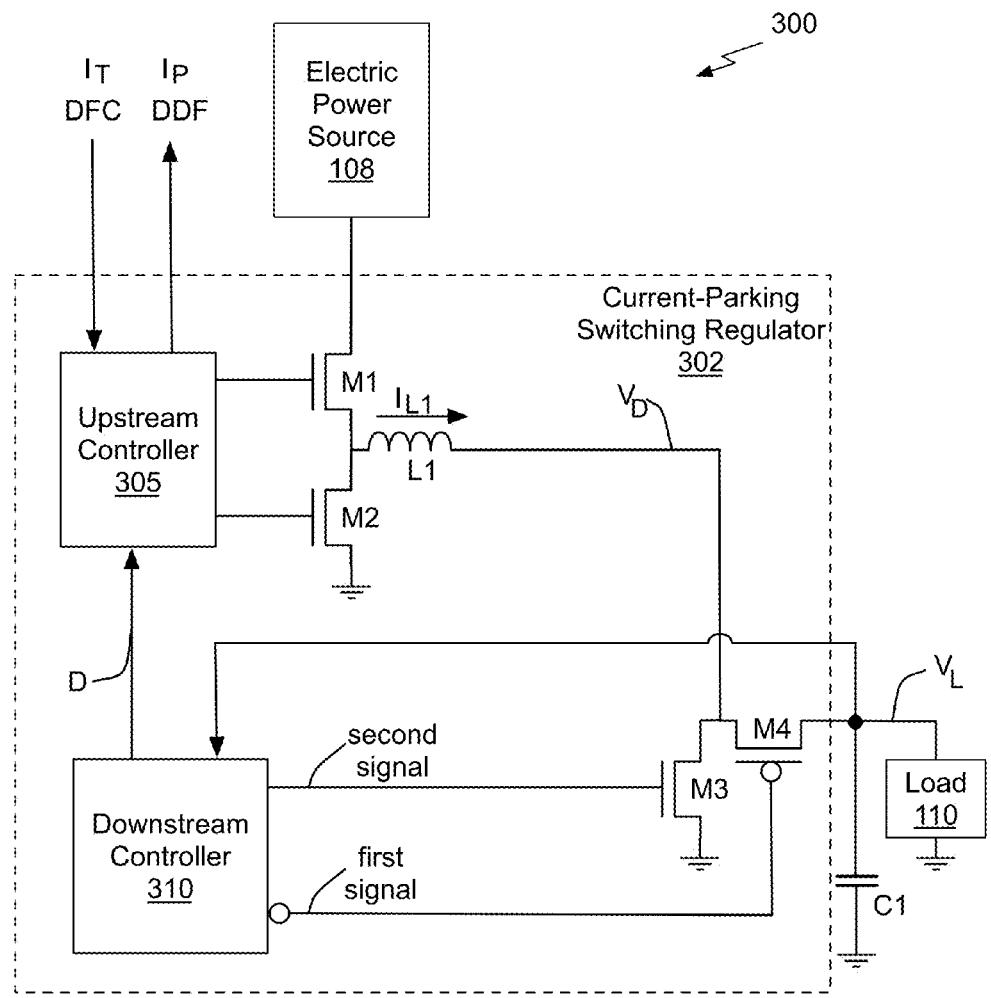
FIG. 3A illustrates a current-parking switching regulator, in accordance with one embodiment.

FIG. 3A illustrates one phase of the multi-phase switching regulator 150, a current-parking switching regulator 302, within an electric power conversion system 300, in accordance with one embodiment. The multi-phase control unit 125 provides a target current ($I_T$) and a duty factor control (DFC) that specifies a target duty factor as an input to an upstream controller 305 in each phase. The multi-phase control unit 125 may also provide an activate signal (not shown) to each phase to activate and deactivate each phase separately.

The upstream controller 305 is configured to generate signals coupled to the gates of the switching mechanisms M1 and M2 that enable and disable the switching mechanisms M1 and M2. When the switching mechanism M1 is enabled, the current source (i.e., inductor L1 or L11) is coupled to the electric power source 108 and when the switching mechanism M2 is disabled the current source is decoupled or isolated from the current sink. When the switching mechanism M2 is enabled, the current source is coupled to the current sink and when the switching mechanism M1 is disabled the current source is decoupled or isolated from the electric power source 108. The upstream controller 305 enables and disables the switching mechanisms M1 and M2 to generate the current $I_{L1}$ or $I_{L11}$.

The upstream controller 305 may be configured to perform current-mode control because the upstream controller 305 regulates the sum of the phase currents rather than a downstream voltage level when multiple voltage control mechanisms are configured to operate at different phases to regulate $V_L$, as described in conjunction with FIG. 1C. While in some embodiments the upstream controller 305 can be configured to regulate absolute inductor current, $I_{L1}$ or $I_{L11}$, in some cases, regulating the fraction of inductor current $I_{L1}$ or $I_{L11}$ that is consumed by the load 110 or 170 is feasible.

The upstream controller 305 receives a signal D from the downstream controller 310. The signal D controls the operation of the voltage control mechanism and corresponds to the duty factor of the downstream controller 310. Specifically, the signal D controls the portion of current that is provided to the load 110 or 170 and therefore, corresponds to the fraction of the current $I_{L1}$ or $I_{L11}$ that is consumed by the load 110 or 170. When D is high, the switching mechanism M4 is enabled to couple the downstream side of the inductor L1 to the load 110.

In one embodiment, the downstream controller 310 is a bang-bang control circuit that is configured to hold the voltage level at the load 110, $V_L$, within a specified voltage range between a minimum voltage level (Vmin) and a maximum voltage level (Vmax). For example, when the nominal voltage level of $V_L$ is 1 volt and a 20 mV ripple is specified, Vmin is specified as 0.99V and Vmax is specified as 1.01V. When multiple current-parking switching regulators 302 are used in a multi-phase switching regulator, such as the multi-phase switching regulator 150 shown in FIG. 1C, a different voltage range may be specified for each phase by the multi-phase control unit 125.

The downstream controller 310 is configured to generate signals coupled to the gates of the switching mechanisms M3 and M4 that enable and disable the switching mechanisms M3 and M4. When the switching mechanism M3 is enabled, the current source (i.e., inductor L1) is coupled to the current sink (i.e., ground) and when the switching mechanism M3 is disabled the current source is decoupled or isolated from the current sink. When the switching mechanism M4 is enabled, the current source is coupled to the load 110 and when the switching mechanism M4 is disabled the current source is decoupled or isolated from the load 110.

As shown in FIG. 3A, in one embodiment, the switching mechanism M3 is a N-type planar MOS transistor and the switching mechanism M4 is a P-type planar MOS transistor. The signals generated by the downstream controller 310 are configured to prevent overlap current and overvoltage on the drains of the switching mechanisms M3 and M4. Specifically, only one of the switching mechanisms M3 and M4 is enabled at a time.

The switching mechanism M3 is disabled before the switching mechanism M4 is enabled to ensure a "dead-time" when both switching mechanisms M3 and M4 are disabled. The parasitic capacitance of the drains of the switching mechanisms M3 and M4 is charged by the current $I_{L1}$ during the dead-time and the switching mechanism M4 is enabled when the voltage across the parasitic capacitance reaches $V_L$, so that current does not flow from the load 110 to the inductor L1. The dead-time between when the switching mechanism M3 is disabled and the switching mechanism M4 is enabled is controlled to allow the inductor L1 to charge the drain of the switching mechanism M4 to $V_L$ before the switching mechanism M4 is enabled. The dead-time also ensures that switching mechanism M3 is disabled when the switching mechanism M4 is enabled to avoid shoot-through current from the load 110 through the switching mechanisms M4 and M3 to ground.

Similarly the dead-time between when the switching mechanism M4 is disabled and the switching mechanism M3 is enabled is controlled to keep the drain of the switching mechanism M4 from being charged too high by $I_{L1}$ before the switching mechanism M3 is enabled. The dead-time between when the switching mechanism M4 is disabled and the switching mechanism M3 is enabled also ensures that switching mechanism M4 is disabled when the switching mechanism M3 is enabled to avoid shoot-through current from the load 110 through the switching mechanisms M4 and M3 to ground.

When power is initially applied to the electric power conversion system 300, $V_L$ is zero and many nanoseconds are needed to charge the capacitor C1 to a voltage between Vmin and Vmax. The downstream controller 310 may be configured to operate using an auxiliary supply voltage $V_{ST}$ that is turned on at startup, before the upstream controller 305 begins to generate the current $I_{L1}$. The switching mechanism M4 is enabled to charge C1 when the current source starts up. In one embodiment, the auxiliary supply voltage is not used for the downstream controller 310 and the downstream controller 310 is configured to disable the switching mechanism M3 and enable the switching mechanism M4 until $V_L$ reaches Vmax.

Figure 3B:
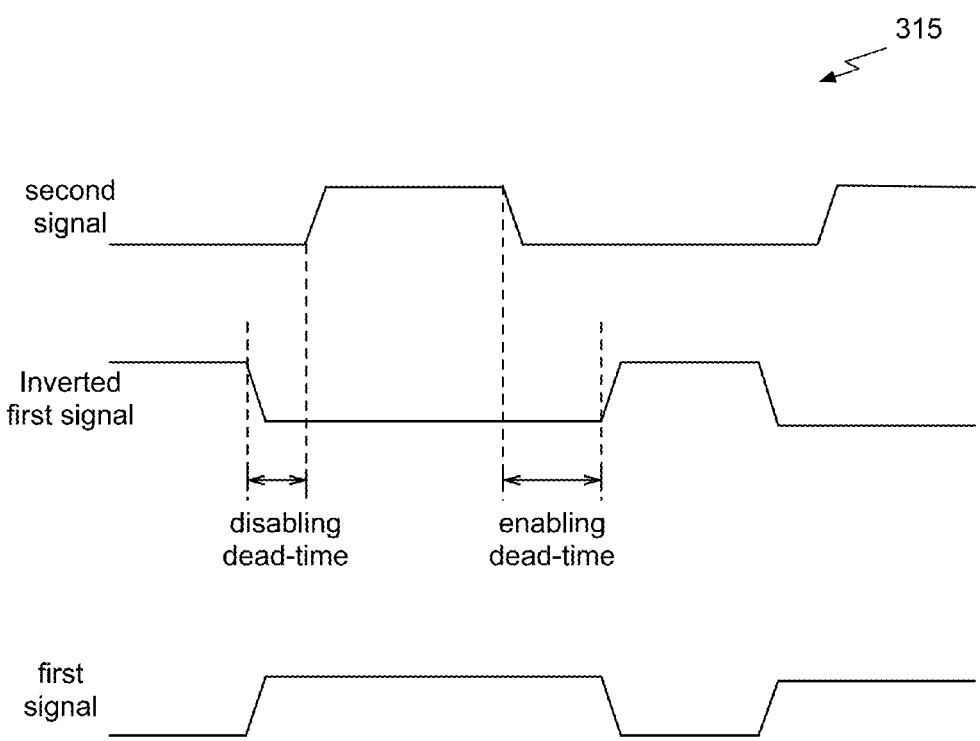
FIG. 3B illustrates waveforms controlling the portion of current that is provided to the load of the current-parking switching regulator shown in FIG. 3A, in accordance with one embodiment.

FIG. 3B illustrates waveforms of the first and second signals that control the portion of inductor current $I_{L1}$ that is provided to the load 110 of the current-parking switching regulator 302 shown in FIG. 3A, in accordance with one embodiment. In one embodiment, the non-overlapping enable signals comprise a first signal and a second signal. The first signal controls (i.e., enables and disables) the switching mechanism M4 and the second signal controls the switching mechanism M3. When the switching mechanism M4 is a P-type MOS transistor, an inverted version of the first signal is coupled to the gate of the P-type MOS transistor. For the purposes of understanding the waveforms 315 shown in FIG. 3B, the inverted first signal is shown. When the inverted version of the first signal is high, the switching mechanism M4 is enabled and when the inverted version of the first signal is low, the switching mechanism M4 is disabled. Similarly, when the second signal is high the switching mechanism M3 is enabled and when the second signal is low, the switching mechanism M3 is disabled.

Separate delays may be used for a first signal that enables the switching mechanism M3 and a second signal the enables the switching mechanism M4. Furthermore, a different delay may be used for a rising transition than is used for a falling transition of the first and/or the second signal. The delays control the duration of the dead-times when both switching mechanisms M3 and M4 are disabled (i.e., when the inverted first signal and the second signal are negated) and the current source is decoupled from the load and decoupled from the current sink. The duration of an "enabling" dead-time between when the switching mechanism M3 is disabled and the switching mechanism M4 is enabled may differ from the duration of a "disabling" dead-time between when the switching mechanism M4 is disabled and the switching mechanism M3 is enabled.

The "disabling" dead-time occurs between when the switching mechanism M4 is disabled by the first signal and the switching mechanism M3 is enabled by the second signal. The "enabling" dead-time occurs between when the switching mechanism M3 is disabled by the second signal and the switching mechanism M4 is enabled by the first signal. During the disabling and the enabling dead-times the switching mechanisms M3 and M4 are disabled (i.e., when the inverted first signal and the second signal are negated). Therefore, the current source is decoupled from both the current sink and the load. The enabling dead-time may be longer than the disabling dead-time to charge the parasitic capacitance at the drains of the switching mechanisms M3 and M4 between the current source and the voltage control mechanism by the current $I_{L1}$. When the switching mechanism M4 is an N-type MOS transistor, an inverted version of the first signal is coupled to the gate of the switching mechanism M4.

As previously explained in conjunction with FIG. 3A, the upstream controller 305 may be configured to control the current control mechanisms based on the fraction of inductor current $I_{L1}$ that is consumed by the load 110 which corresponds to the duty factor of the signal D generated by the downstream controller 310. Therefore, the signal D is provided as an input to the upstream controller 305. The upstream controller 305 may include a duty factor measurement unit that is configured to measure the duty factor using the signal D to generate DDF. In one embodiment, the downstream controller 310 is configured to generate DDF for output to the upstream controller 305. The output signal DDF that is provided by the upstream controller 305 (see FIG. 3A) to the multi-phase control unit 125 is the measured duty factor of the signal D.

The upstream controller 305 may be configured by the multi-phase control unit 125 to provide a reserve amount of current $I_{L1}$ that is greater than the current that is consumed by the load 110. For example, a 20% reserve may be provided by maintaining $I_{L1}$ at a target current $I_T$ of 10 amps assuming that the current consumed by the load 110 is 8 amps. A DFC that corresponds to the target current may be input to the upstream controller 305 by the multi-phase control unit 125. DDF (i.e., the measured downstream duty factor of the signal D) increases in response to higher current demands by the load 110, and, when DDF is higher than DFC, $I_{L1}$ is increased to provide current to the load 110 using a lower duty factor at the downstream controller 310 (i.e., a duty factor that is closer to DFC). Similarly, DDF decreases in response to lower current demands by the load 110, and when DDF is lower than DFC, $I_{L1}$ is decreased to provide current to the load 110 using a duty factor that is closer to DFC. In one embodiment, DFC varies based on a processing workload associated with the load 110. For example, just before a heavy workload is initiated, DFC is decreased to increase the current. When a target current is used to control generation of the current, the target current may be increased just before a heavy workload is initiated. The upstream controller 305 may be configured to estimate the current $I_{Load}$, as described in conjunction with FIG. 4B.

As previously explained in conjunction with FIG. 1C, the multi-phase control unit 125 may be configured to minimize switching energy by configuring some phases to be always on, configuring other phases to be always off, and configuring a minimum number of phases to switch the switching mechanisms M3 and M4. An active phase, one that an upstream controller 305 is providing with a current $I_{L1}$, can be in one of three states: on, off, or switching. In one embodiment, the number of phases that are configured as always on is calculated to be $N_{on}=I_U/I_{Pmax}$. The number of switching phases is $N_{sw}=I_U/I_{Pmin}-N_{on}$. The remaining phases are off, $N_{off}=N-N_{on}-N_{sw}$. The maximum and minimum phase currents are computed from $I_{TU}$:

$$I_{Pmin} = \frac{I_{TU}}{N} \text{ and } I_{Pmax} = \frac{\left(1+\frac{R}{N}\right)I_{TU}}{N}$$

as previously described.

Figure 3C:
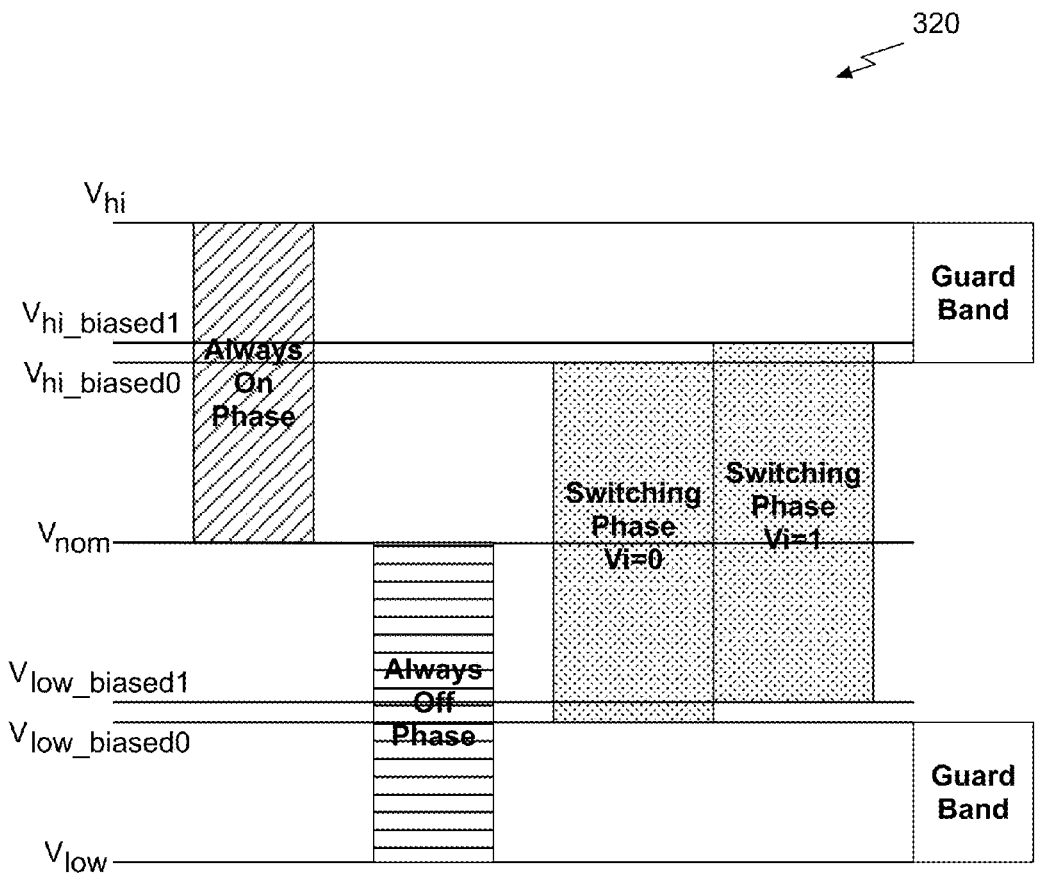
FIG. 3C illustrates different voltage ranges used to configure the downstream controllers within a multi-phase switching regulator, in accordance with one embodiment.

FIG. 3C illustrates different voltage ranges used to configure the downstream controllers 310 within the multi-phase switching regulator 150, in accordance with one embodiment. The downstream controller 310 in each of the phases of the multi-phase switching regulator 150 may be a bang-bang control control circuit that is configured by the multi-phase control unit 125 with different voltage ranges specified by Vmin and Vmax. To respond to load current transients, always on phases are turned off if $V_{Load}>V_{hi}$ and turned back on when $V_{Load}<V_{nom}$. The always off phases will be turned on if $V_{Load}<V_{low}$ and back off when $V_{Load}>V_{nom}$. Therefore, Vmax and Vmin for the always on phases are $V_{hi}$ and $V_{nom}$ and, Vmax and Vmin for the always off phases are $V_{nom}$ and $V_{low}$.

Switching phase i turns on when $V_{Load}<V_{low\_biasedi}$, where $V_{low\_biasedi}=V_{low}+V_g+V_i$, and off when $V_{Load}>V_{hi\_biasi}$, where $V_{hi\_biasedi}=V_{hi}-V_g+V_i$. A small guard band $V_g$ is set between the switching limits $V_{hi\_biasedi}$ and $V_{low\_biasedi}$ and the hard limits $V_{hi}$ and $V_{low}$ to avoid switching the always on and always off phases except in extreme cases. To stagger the switching of the phases, a per-phase stagger voltage $V_i$ is added to the limit voltages Vmin and Vmax that control the switching phases. This biases a switching phase with $V_i$ high to be on and a switching phase with $V_i$ low to be off. For example, when $V_{hi\_bias1}>V_{Load}>V_{hi\_biased0}$ the switching phase $V_i=1$ is on and the switching phase $V_i=0$ is off. Vmax and Vmin for the switching phases are $V_{hi\_biasedi}$ and $V_{low\_biasedi}$. In one embodiment, $V_i$ is a zero-mean triangle wave with a frequency equal to the switching frequency, phase of $360i/N_{sw}$, and magnitude that is a small fraction of $V_{hi}$-$V_{low}$. The switching frequency is estimated by measuring the period of the last cycle of phase 0.

The multi-phase control unit 125 sets the minimum current target $I_{TU}$ to maintain a reserve current $I_h$ over the current load current $I_{TU}$=$I_{Load}$+$I_h$. The load current $I_{Load}$ is estimated from the instantaneous current $I_P$ of each phase multiplied by the duty factor of the phase, DDF.

$$I_{Load} = \sum_{i=1}^{N} I_i DDF_i$$

The multi-phase control unit 125 keeps a running estimate of the instantaneous current $I_P$ for each phase i. The estimate may be an actual measurement of $I_P$ received from the upstream controllers 305 or may be computed by interpolating between switching points.

In one embodiment, the load current $I_{Load}$ is estimated by the multi-phase control unit 125 by measuring the derivative of the load voltage, $V_{Load}$. At any point in time $$I_{Load} = \sum_{on\ phases} I_i - C_1 \frac{dV_L}{dt}$$

$I_{Load}$ is used by the multi-phase control unit 125 to compute N and provide the values of $I_T$ and DFC to the phases.

Figure 3D:
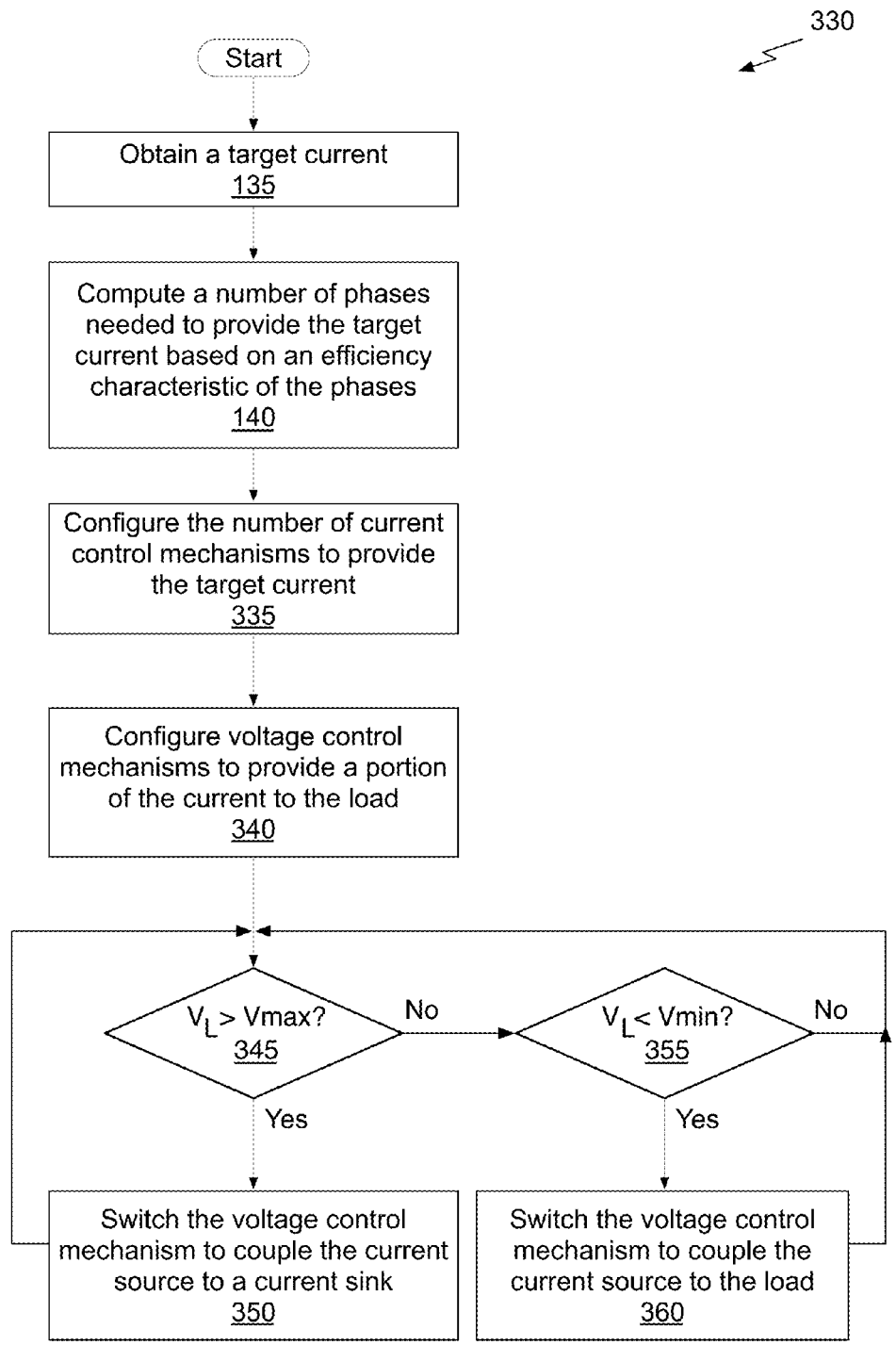
FIG. 3D illustrates another flowchart of a method for regulating the voltage level provided to a load using a multi-phase switching regulator, in accordance with one embodiment.

FIG. 3D illustrates another flowchart 330 of a method for regulating voltage at a load using a multi-phase switching regulator, in accordance with one embodiment. At step 135, a target current $I_{TU}$ is received by the multi-phase switching regulator 150. At step 140, the multi-phase switching regulator 150 computes a number of phases that are needed to provide the target current to the load 110 based on a power conversion efficiency characteristic of the phases.

At step 335, the current control mechanisms in N phases (i.e., at least one phase) are configured to provide the target current to the load 110 by providing the inputs $I_T$ and DFC to each phase. The upstream controllers 305 configure the current control mechanisms to generate the currents $I_{L1}$ through the inductors L1 according to the inputs $I_T$.

At step 340, the downstream controllers 310 configure the voltage control mechanisms to provide a portion of the current to the load 110 to regulate the voltage level, $V_L$ at the load 110. The multi-phase control unit 125 may provide Vmin and Vmax values to each phase or the Vmin and Vmax values may be determined by each phase based on whether the phase is configured by the multi-phase control unit 125 as always on, always off, or switching.

Steps 345, 350, 355, and/or 360 are performed by each of the phases to regulate the voltage at the load 110. At step 345, the downstream controllers 310 determines if $V_L$ is greater than Vmax, and, if so, then at step 350, the voltage control mechanism is switched to decouple the current source from the load 110 and to couple the current source (i.e., the inductor L1) to a current sink (i.e., ground) to provide a lesser portion of $I_{L1}$ to the load 110 to reduce $V_L$. After step 350, the downstream controller returns to step 345.

If, at step 345, $V_L$ is not greater than Vmax, then at step 355, the downstream controller 310 determines if $V_L$ is less than Vmin. If $V_L$ is less than Vmin, then at step 360 the downstream controller configures the voltage control mechanism to couple the current source to the load 110 and to decouple the current source from the current sink to provide a greater portion of $I_{L1}$ to the load 110 to increase $V_L$. After step 360, the downstream controller 310 returns to step 345. Otherwise, when $V_L$ is not greater than Vmax and is not less than Vmin (i.e., $V_L$ is within the range bounded by Vmin and Vmax), then the downstream controller returns to step 345. When the target current changes, the multi-phase control unit 125 repeats the method, starting at step 135.

Upstream Controller

Figure 4A:
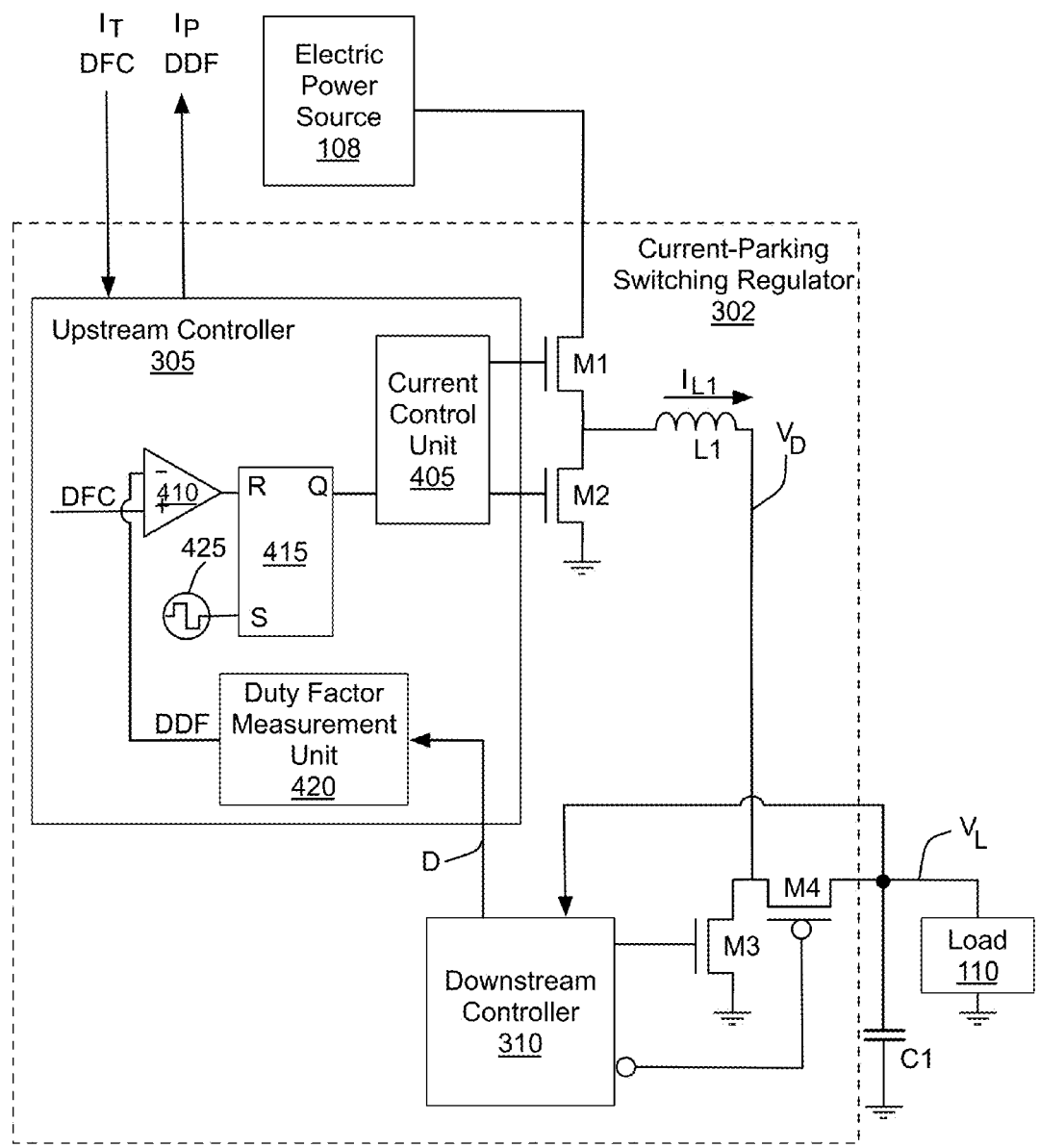
FIG. 4A illustrates an upstream controller of the current-parking switching regulator shown in FIG. 3A, in accordance with one embodiment.

FIG. 4A illustrates the upstream controller 305 of the current-parking switching regulator 302 shown in FIG. 3A, in accordance with one embodiment. The upstream controller 305 is configured as a PWM controller configured to maintain DDF above the duty factor that is specified by the DFC (duty-factor command). DFC should be low enough that DDF remains in a target range over an entire period of the upstream controller 305 (i.e., the period of the PWM frequency).

A set-reset flip-flop 415 is set by an oscillator 425 at the PWM frequency (typically 300 kHz) and reset by a comparator 410 that indicates when the DDF falls below DFC. The Q output of the flip-flop 415 drives a current control unit 405 that generates enable signals for the switching mechanisms M1 and M2 of the current control mechanism. In one embodiment, the current control unit 405 is a half-bridge driver. The Q output is high when the R input is low and the output of the oscillator 425 is high. The Q output will remain high until the R input is high. The Q output is low whenever the R input is high (when DDF falls below DFC). The current control unit 405 enables the switching mechanism M1 and disables the switching mechanism M2 when Q is high to increase the current $I_{L1}$. The current control unit 405 disables the switching mechanism M1 and enables the switching mechanism M2 when Q is low to decrease the current $I_{L1}$. The enable signals generated by the current control unit 405 should be non-overlapping so that the output of the electric power source 108 is not shorted to ground. The enable signal provided to the switching mechanism M1 may be configured to implement a bootstrap power supply to generate a gate drive above the voltage at the electric power source 108 (e.g., 12V).

Figure 4B:
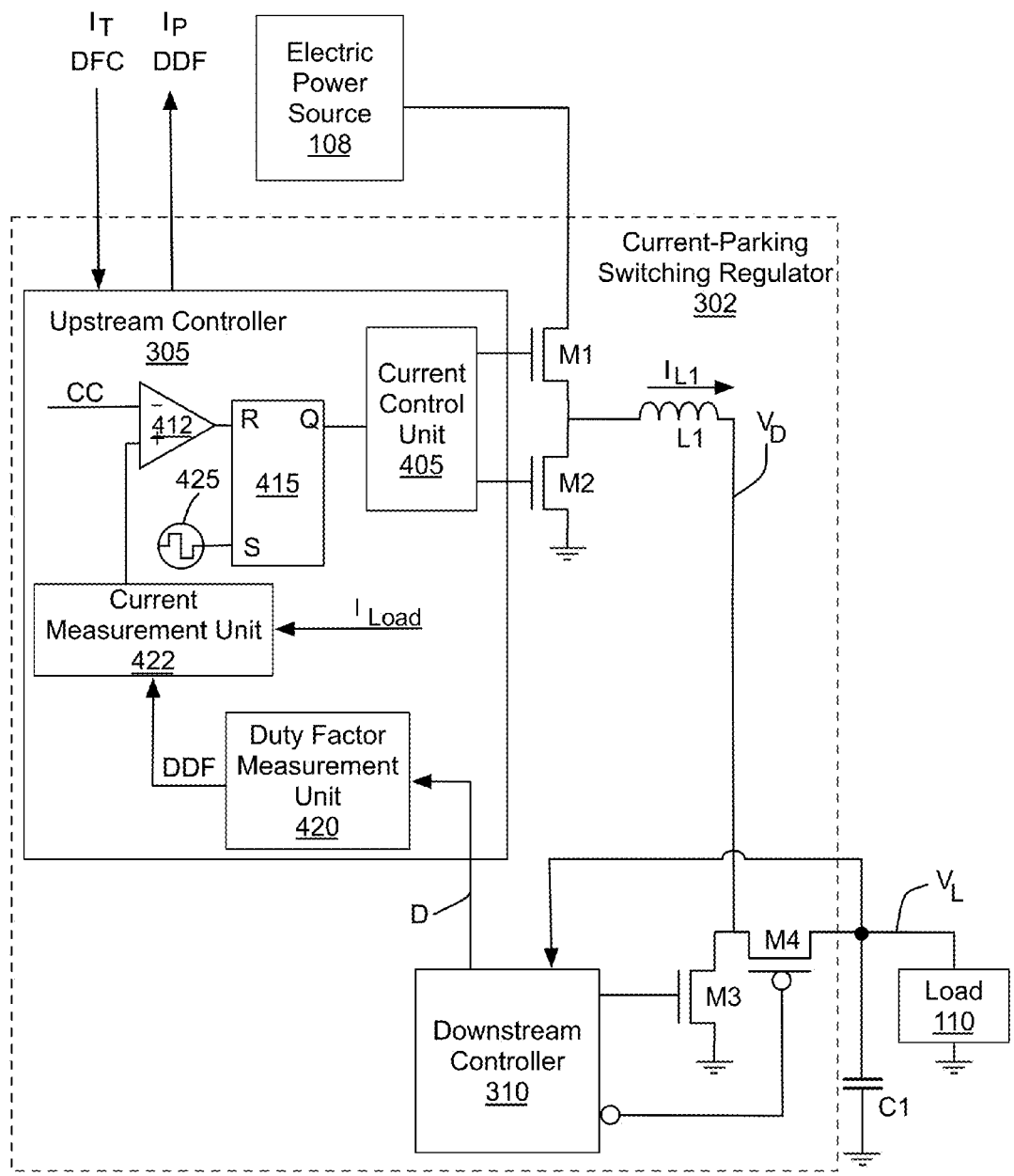
FIG. 4B illustrates another upstream controller of the current-parking switching regulator shown in FIG. 3A, in accordance with one embodiment.

FIG. 4B illustrates another version of the upstream controller 305 of the current-parking switching regulator 302, in accordance with one embodiment. A current measurement unit 422 is configured to divide the portion of the current that is provided to the load 110, current $I_{Load}$, by DDF to compute the current $I_{L1}$. A comparator 412 is configured to compare the computed current to a target current $I_T$ received from the multi-phase control unit 125 or specified by a current command (CC). Reset goes high when the computed current is greater than the target current to reduce the generated current $I_{L1}$.

In another embodiment, the current measurement unit 422 may be configured to measure $I_{L1}$ directly and the duty factor measurement unit 420 is omitted. The comparator 412 would be configured to compare the measured $I_{L1}$ to the target current. Reset would go high when the measured current $I_{L1}$ is greater than the target current to reduce the generated current $I_{L1}$.

Figure 5:
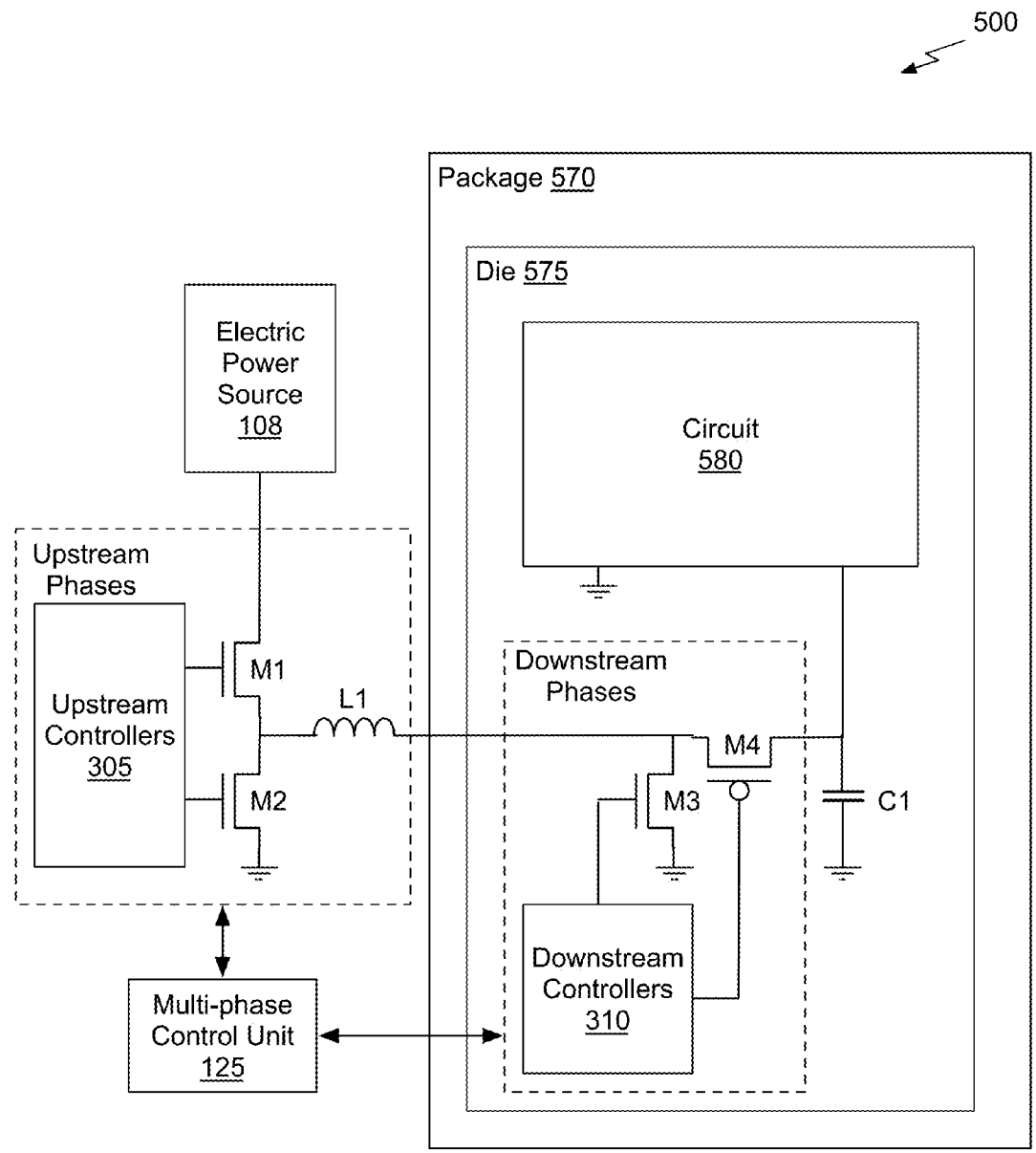
FIG. 5 illustrates a diagram of the current-parking switching regulator within a system, according to one embodiment.

FIG. 5 illustrates a system 500 including a current-parking switching regulator, according to one embodiment. The current-parking switching regulator in the system 500 may be the multi-phase switching regulator 150 shown in FIG. 1C. The multi-phase control unit 125 is coupled to multiple phases that each include an upstream phase and a downstream phase.

The electric power source 108 is coupled to the current control mechanisms in each upstream phase. The inductor L1 within each upstream phase is coupled to a respective downstream phase. In an alternate embodiment, the upstream phases each include inductors L11 and L2. The N upstream controllers 305 that are active are configured by the multi-phase control unit 125 to generate a current through the inductor L1. The downstream controllers 310 are configured by the multi-phase control unit 125 to be always on, always off, or switching to regulate the voltage level at the load, i.e., circuit 580. In one embodiment, the downstream controllers 310 are each configured by the multi-phase control unit 125 to maintain the voltage level at the circuit 580 within a predetermined range bounded by respective Vmin and Vmax values.

The inductor L1 is positioned outside of a package 570 that encloses the circuit 580. A second inductor L2 (not shown) may be positioned inside of the package 570, reducing the second parasitic capacitance CPB compared with the first parasitic capacitance CPA, as described in conjunction with FIG. 1B. The second inductor L2, the switching mechanisms M3 and M4 (or M13 and M14), and the capacitor C1 (or C11) may be fabricated as part of the die 575 that includes the circuit 580. In one embodiment, the second inductor L2 is a planar air-core inductor and the switching mechanisms M3 and M4 (or M13 and M14) are planar MOS transistors. Although a single phase of the current-parking switching regulator with a single inductor is shown in FIG. 5, one or more of the multiple phases of the current-parking switching regulator may be implemented with a split inductor. Furthermore, a combination of one or more current-parking switching regulators (with or without a split inductor) may be used with one or more conventional electric power conversion devices to provide power to the circuit 580.

Figure 6:
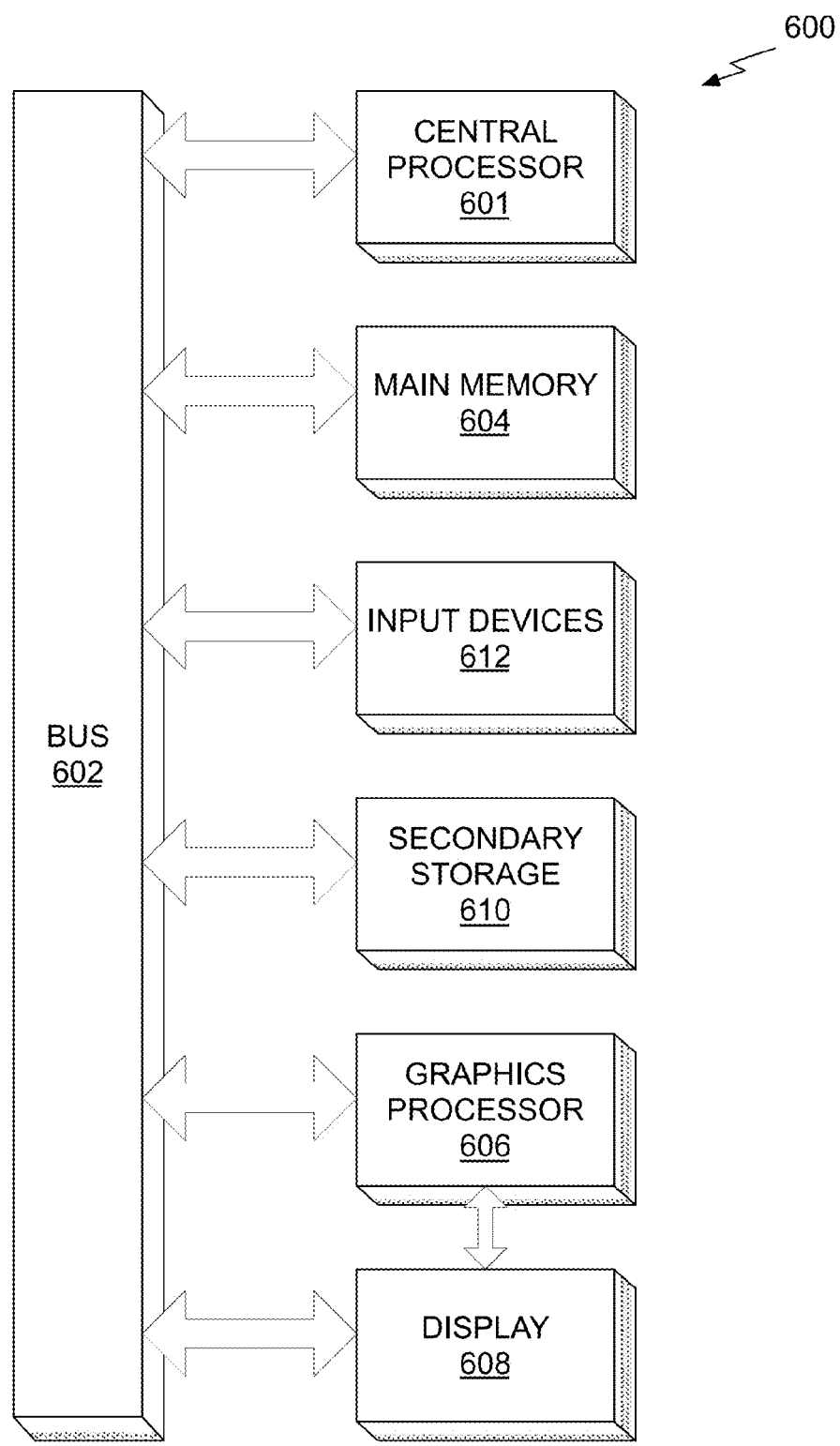
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one central processor 601 that is connected to a communication bus 602. The communication bus 602 may be implemented using any suitable protocol, such as PCI (Peripheral Component Interconnect), PCI-Express, AGP (Accelerated Graphics Port), HyperTransport, or any other bus or point-to-point communication protocol(s). The system 600 also includes a main memory 604. Control logic (software) and data are stored in the main memory 604 which may take the form of random access memory (RAM).

The system 600 also includes input devices 612, a graphics processor 606, and a display 608, i.e. a conventional CRT (cathode ray tube), LCD (liquid crystal display), LED (light emitting diode), plasma display or the like. User input may be received from the input devices 612, e.g., keyboard, mouse, touchpad, microphone, and the like. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user. One or more of the systems 500 shown in FIG. 5, may be incorporated in the system 600 to provide power to one or more of the chips.

The system 600 may also include a secondary storage 610. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. Computer programs, or computer control logic algorithms, may be stored in the main memory 604 and/or the secondary storage 610. Such computer programs, when executed, enable the system 600 to perform various functions. The main memory 604, the storage 610, and/or any other storage are possible examples of computer-readable media.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, server, workstation, game consoles, embedded system, and/or any other type of logic. Still yet, the system 600 may take the form of various other devices including, but not limited to a personal digital assistant (PDA) device, a mobile phone device, a television, etc.

Further, while not shown, the system 600 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
obtaining a target current;
computing a number of regulator phases needed to provide the target current to
a load based on an efficiency characteristic of the regulator phases; and configuring the regulator phases to provide the target current to the load, wherein
a first regulator phase is configured to couple a first current source to the load to provide a first portion of the target current, and
a second regulator phase couples the load to a second current source when an output voltage level at the load is less than a minimum voltage level and decoupled the load from the second current source when the output voltage level at the load is greater than a maximum voltage level.

2. The method of claim 1, wherein the second regulator phase is configured to provide a remaining portion of the target current.

3. The method of claim 1, wherein a third regulator phase is configured to decouple a third current source from the load.

4. The method of claim 3, wherein the third regulator phase is further configured to couple the third current source to the load only when the output voltage level at the load is less than a second minimum voltage level that is less than the minimum voltage level.

5. The method of claim 1, wherein the minimum voltage level and the maximum voltage level are computed using a per-phase stagger voltage.

6. The method of claim 5, wherein the per-phase stagger voltage is a triangle wave.

7. The method of claim 1, wherein the first regulator phase is further configured to decouple the first current source from the load only when the output voltage level at the load is greater than the maximum voltage level.

8. The method of claim 1, wherein the target current is set according to a processing workload.

9. The method of claim 1, wherein the computing of the number of regulator phases needed to provide the target current comprises accessing a lookup table using the target current.

10. The method of claim 1, wherein the computing of the number of regulator phases needed to provide the target current comprises performing a gradient search.

11. The method of claim 1, wherein the target current is greater than an average current that is needed to regulate an output voltage level at the load.

12. The method of claim 1, wherein the generating of the current comprises alternately enabling a first switching mechanism to couple the current source to an electric power source while disabling a second switching mechanism to decouple the current source from a current sink according to the target current and the number of the regulator phases and then disabling the first switching mechanism to decouple the current source from the electric power source while enabling the second switching mechanism to couple the current source to the current sink according to the target current and the number of the regulator phases.

13. The method of claim 1, wherein the current source comprises an inductor coupled between a voltage control mechanism and a current control mechanism.

14. A multi-phase electric power conversion device, comprising:

at least two regulator phases; and a multi-phase control unit configured to: obtain a target current;

compute a number of the regulator phases needed to provide the target current to a load based on an efficiency characteristic of the regulator phases; and configure the regulator phases to provide the target current to the load, wherein a first regulator phase of the regulator phases is configured to couple a first current source to the load to provide a first portion of the target current, and a second regulator phase couples the load to a second current source when an output voltage level at the load is less than a minimum voltage level and decoupled the load from the second current source when the output voltage level at the load is greater than a maximum voltage level.

15. The multi-phase electric power conversion device of claim 14, wherein the second regulator phase of the regulator phases is configured to provide a remaining portion of the target current.

16. The multi-phase electric power conversion device of claim 14, wherein a third regulator phase of the regulator phases is configured to decouple a third current source from the load.

* * * * *